United States Patent
Schaffel et al.

(10) Patent No.: US 9,910,838 B2
(45) Date of Patent: Mar. 6, 2018

(54) ALTERNATES OF ASSETS

(75) Inventors: Robert Schaffel, Fremont, CA (US);
Michael Jamrosy, Hamburg (DE);
Daniel C. Brotsky, Berkeley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 3055 days.

(21) Appl. No.: 11/230,775

(22) Filed: Sep. 20, 2005

(65) Prior Publication Data
US 2014/0033008 A1    Jan. 30, 2014

(51) Int. Cl.
*G06Q 30/00* (2012.01)
*G06F 17/24* (2006.01)
*G06F 17/21* (2006.01)
*G06F 17/22* (2006.01)

(52) U.S. Cl.
CPC ............ *G06F 17/24* (2013.01); *G06F 17/211* (2013.01); *G06F 17/2288* (2013.01)

(58) Field of Classification Search
CPC ..... G06F 17/24; G06F 17/211; G06F 17/2288
USPC ............ 705/26, 27, 26.1, 26.2, 26.25, 26.3, 705/26.35, 26.4, 26.41–26.44, 26.5, 705/26.61–26.64, 26.7, 26.8, 26.81, 705/26.82, 26.9, 27.1, 27.2
See application file for complete search history.

(56) References Cited

U.S. PATENT DOCUMENTS

| | | | |
|---|---|---|---|
| 6,904,185 B1* | 6/2005 | Wilkins et al. | 382/311 |
| 7,099,040 B1* | 8/2006 | Cooper et al. | 358/1.9 |
| 7,441,182 B2* | 10/2008 | Beilinson et al. | 715/229 |
| 2003/0210335 A1* | 11/2003 | Carau et al. | 348/231.2 |
| 2003/0233379 A1* | 12/2003 | Cohen et al. | 707/200 |
| 2004/0201691 A1* | 10/2004 | Bryant et al. | 348/207.1 |
| 2005/0172219 A1* | 8/2005 | Hintermeister et al. | 715/513 |

FOREIGN PATENT DOCUMENTS

WO    WO 2004/015588 A2 *   2/2004   ............ G06F 17/24

OTHER PUBLICATIONS

Lisa Tang "Producing Informative Text Alternatives for Images" © Copyright Lisa Tang, Sep. 2012.*

* cited by examiner

*Primary Examiner* — Naeem U Haq
(74) *Attorney, Agent, or Firm* — Shook, Hardy & Bacon L.L.P.

(57) ABSTRACT

Embodiments of methods to designate alternates of assets, methods to display representations of alternates, user interfaces, computer products, and digital assets are generally described herein. Other embodiments may be described and claimed.

20 Claims, 19 Drawing Sheets

ALTERNATES OF ASSETS

TECHNICAL FIELD

Various embodiments described herein relate generally to digital asset management methods, user interfaces, systems, and apparatus.

BACKGROUND

A user involved in a project of moderate to high complexity may need to deal with a large number of assets. For example, a project to produce a product catalog may include numerous page layouts. A compound document may include one or more page layouts, each of which may include versions of photographic, textual, and graphical assets. Each asset may have one or more prior, historical versions, which represent snapshots of the asset at a given time. Historical versions are sometimes used to revert to an asset's previous state following destructive changes to a version of an asset.

At times, an editor, layout designer, or client may want to have the option to select among several historical versions of a particular asset for inclusion in a final document (e.g., a page layout). To provide the ability to select between historical versions of an asset, each of the historical versions being considered may need to be converted into a new, separate asset.

In some situations, a user may be working with a compound document whose own historical versions include earlier versions of photographic, textual, or graphical assets. When a user wants to access an earlier version of a compound document, any earlier version of an included asset also should be represented with accuracy. For an earlier version of an asset to be available as a separate entity, the user may need to convert it into a new, separate asset.

In other situations, a user may need to create parallel renditions of an asset. For example, a user may need to create a high resolution rendition for a print application, and a low resolution rendition for a web application. Again, the parallel renditions may need to be represented using separate assets.

In each of the cases described above, using manual processes, a user may need to create new, separate assets from multiple historical versions. Once created, the status of each new asset is maintained manually.

DETAILED DESCRIPTION

Embodiments of the inventive subject matter, described below, pertain to features of systems, apparatus, methods, and or software, which enable a user to create, display, manage, and/or edit digital assets. An "asset" or "digital asset" may be defined, in various embodiments, as a digital representation of a document, file, photograph, illustration, graphic, text, resource, email, and/or layout, for example, but not by way of limitation. An "asset" also or alternatively may be defined, in various embodiments, as a conceptual unit of a digital asset management system, which corresponds to a user's notion of a "mutable document" whose identity remains the same, but whose contents may change. An "asset version" may be defined as a representation of an asset's state at a particular point of time, or a historical version of an asset. In various embodiments, an asset may include content only, content and embedded secondary data (e.g., metadata), or embedded secondary data only. An "aspect" may be defined as an asset and all the versions of the asset. "Content" may be defined as graphical or textual representation of concepts, ideas, or information to be communicated. "Embedded secondary data" or "metadata" may be defined as information associated with or embedded within an asset, which specifies characteristics of the asset, in an embodiment. As will be described in detail below, an asset may permit its designation as an "alternate" of one or more other assets, in accordance with various embodiments.

Figure 1:
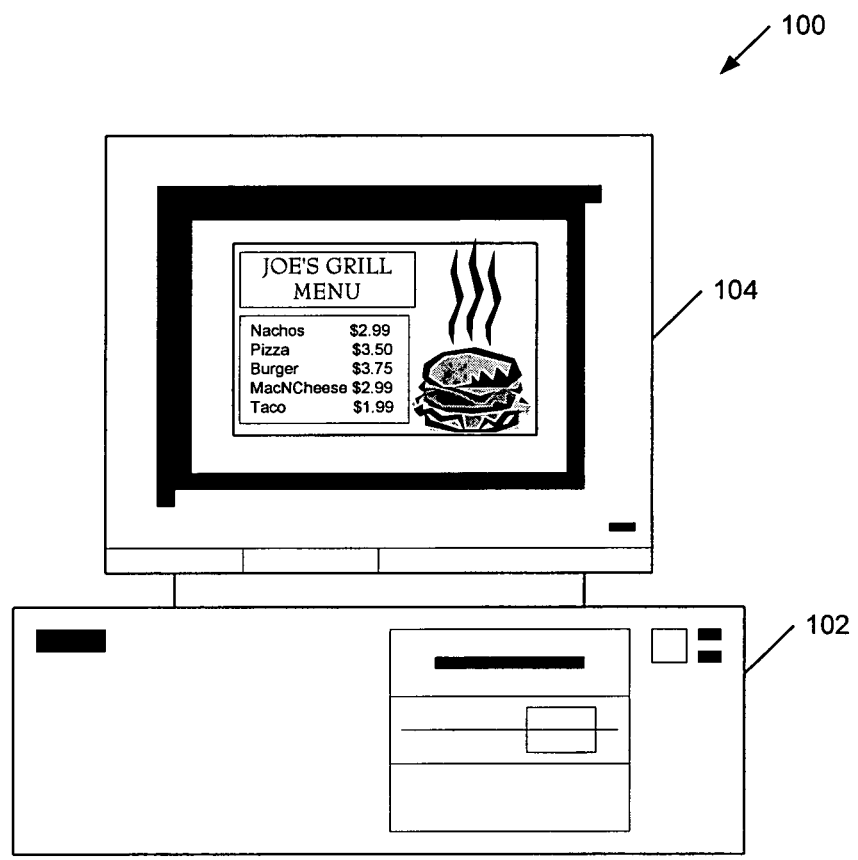
FIG. 1 illustrates a document viewing apparatus, in accordance with an example embodiment.

FIG. 1 illustrates a document viewing apparatus 100, in accordance with an example embodiment. A "document viewing apparatus" is an apparatus upon which an electronic representation of an asset and/or a document may be created, displayed, managed, and/or edited, in conjunction with one or more software applications. A "document" may be defined as a digitally represented entity, which includes one or more assets, or identifiers of one or more assets. Document viewing apparatus 100 may include a desktop or laptop computer, a portable electronic device (e.g., a cellular telephone, personal data assistant), a television system, a set-top box, a gaming console, and/or another electronic device, in various embodiments.

Document viewing apparatus 100 includes a processing system 102 and a display device 104, in an embodiment. Document viewing apparatus 100 may additionally include various user interfaces (e.g., a keyboard, one or more user pointing devices (e.g., a mouse, trackball, touchpad, joystick)) and/or one or more communication subsystems (not illustrated), which enable document viewing apparatus 100 to send information to and/or retrieve information from external networks via wired or wireless connections, in various embodiment.

Processing system 102 may include one or more processors, memory devices, peripheral electronics, and other components, which enable document viewing apparatus 100 locally to execute one or more software applications, and/or to interact (e.g., over a network) with one or more remotely-executed software applications. Further, processing system 102 may enable document viewing apparatus 100 to access locally-stored or remotely-stored, document-related information.

Processing system 102 additionally may cause display device 104 to display a representation of an asset and/or a document. Display device 104 may include, for example, a computer monitor or screen, a touchscreen, a display (e.g., a liquid crystal display), or another apparatus capable of visually displaying a representation of an asset or document version.

Document viewing apparatus 100 may have stored upon it (or may be capable of accessing) one or more software applications, which provide a user with the abilities to access, create, modify, and/or edit assets. For example, but not by way of limitation, these software applications may be selected from a group of applications that includes a document creation and/or viewing application, an image editing and processing application, an image viewing application, a layout design application, and/or a webpage and/or mobile device document authoring application.

In an embodiment, document viewing apparatus 100 may alternatively or additionally have stored upon it (or may be capable of accessing) one or more software applications, which are capable of managing and/or accessing asset versions. For example, but not by way of limitation, document viewing apparatus 100 may include one or more software applications selected from a group of applications that includes a version control application, a configuration management application, an asset management application, and/or a project or file sharing application.

In some embodiments, document viewing apparatus 100 may enable a user to create, display, and/or edit a representation of a "compound document," such as the document represented on display device 104, for example. A "compound document" may be defined as a document that includes one or more links, where a link may reference an asset, in an embodiment. The description, herein, describes and illustrates embodiments of the inventive subject matter using examples of compound documents. It is to be understood that embodiments of the inventive subject matter also could apply to assets outside of the context of a document. Accordingly, the compound document examples included herein are not meant to limit the scope of the inventive subject matter only to use in conjunction with compound documents.

Figure 2:
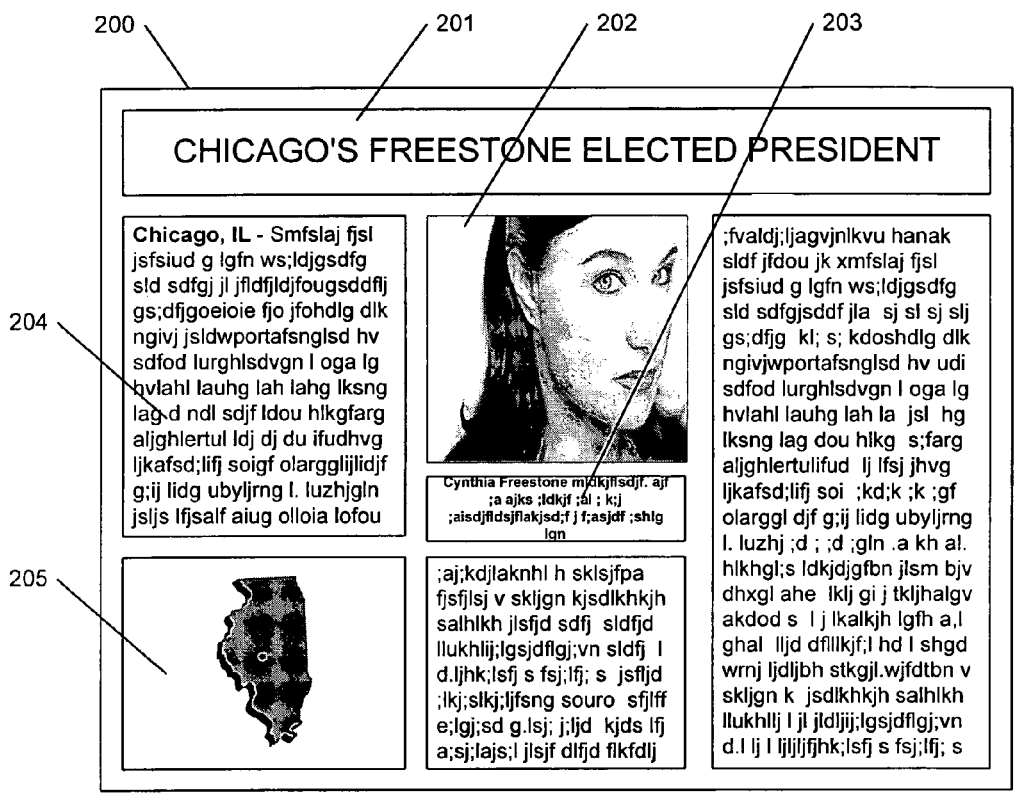
FIG. 2 is a visual representation of a compound document, in accordance with an example embodiment.

FIG. 2 illustrates a visual representation of a compound document 200, in accordance with an example embodiment. Compound document 200 includes representations of multiple assets 201, 202, 203, 204, and 205. Asset 201 includes a text headline. Assets 202, 203 include a photograph and text caption, respectively. Asset 204 includes a text body of an article. Finally, asset 205 includes an illustration. In other embodiments, a compound document may represent one or more different types of assets.

A project may include a compound document as its end result. For example, a project may be to generate a newspaper article, by a given deadline, which reports on the outcome of an election. The project may be conducted in the context of a workflow, which includes a series of processes used to accomplish the end result.

Using the example illustrated in FIG. 2, the workflow may include the collection, creation, and/or modification of assets, the selection of assets for inclusion in a compound document (e.g., document 200), one or more review cycles, and the publishing or production of a final version of the document. In an embodiment, the assets associated with a project may be managed by an asset management application, a version control application, a configuration management application, and/or an asset access application.

Figure 3:
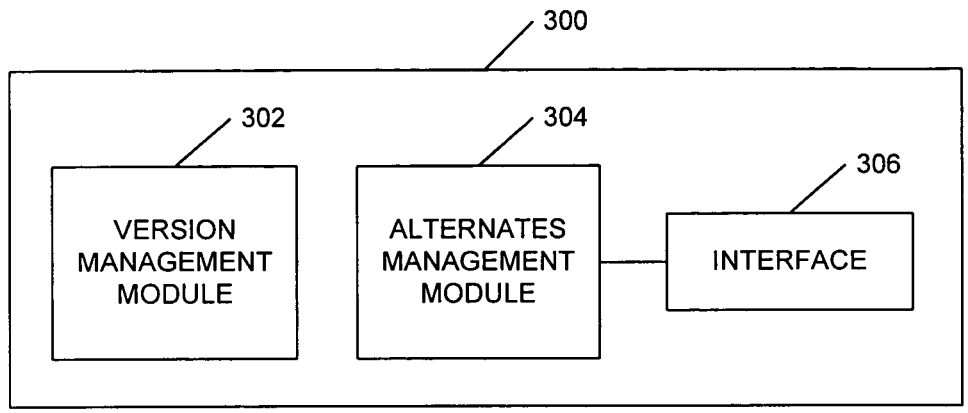
FIG. 3 is a simplified, block diagram of an asset management application, in accordance with an example embodiment.

FIG. 3 is a simplified, block diagram of an asset management application 300 or system, in accordance with an example embodiment. Asset management application 300 may include one or more version management modules 302, one or more alternates management modules 304, and an interface 306, in an embodiment.

A version management module 302 is to facilitate creation and tracking of asset versions that are associated with a project, in an embodiment. As mentioned previously, an "asset version" may be defined as a representation of an asset's state at a particular point of time. Each asset version may represent a revised (or unrevised) representation of previous versions of the asset. Accordingly, asset versions may be created progressively.

Figure 4:
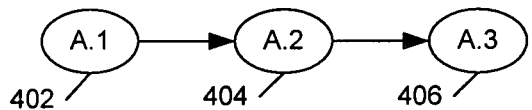
FIG. 4 is a diagram illustrating a simple example of a progression of versions of an asset.

FIG. 4 is a diagram illustrating a simple example of a progression of asset versions for an asset 400. Asset versions may be tracked using a traditional version control system, for example. Asset versions may be created in linear "version progressions," as revisions are made to the asset's versions. A "version progression" may be defined herein as a set of asset versions that are derivations of a same original asset version.

Asset 400 may be referred to herein as "asset A." In the illustrated example, asset A 400 includes three versions 402, 404, 406. An "original" or first version of asset A 400 is represented, in the example, as version "A.1" (circle 402). For example, a first version of an asset may include a representation of a digital photograph. The first version may be revised (e.g., the photograph cropped), and a second version, which includes the revision, may be created. In the example, the second version of asset A 400 is represented as version "A.2" (circle 404). The second version may be further revised (e.g., the cropped photograph retouched) and a third version of asset A 400, which includes the additional revisions, may be created. In the example, the third version is represented as version "A.3" (circle 406).

The example illustrated in FIG. 4 is intended to point out a characteristic of a set of asset versions. A set of asset versions have a shared genealogy. In other words, within a single asset, each version may be traced back to a common, original version of the asset. Accordingly, versions within a version progression have a "version relationship," which identifies them as versions of a single asset.

Referring back to FIG. 3, in an embodiment, version management module 302 may enable version relationships to be created and maintained, and may further enable any asset version to be accessed. In contrast to version management module 302, an alternates management module 304 is to facilitate designation and tracking of "alternates" of assets (e.g., assets that are associated with a project). Embodiments may be implemented in straight-line version systems or branching version systems.

Interface 306 is to receive one or more instructions, based on one or more user inputs, to designate a first asset file as an alternate of a second asset file, in an embodiment.

Accordingly, in an embodiment, interface 306 includes a means for receiving one or more instructions.

Alternatives management module 304, in response to receiving the one or more instructions, is to designate the first asset file as the alternate of the second asset file by storing alternate designation information. Accordingly, in an embodiment, alternates management module 304 includes a means for designating a first asset file as an alternate of a second asset file. Storage of alternate designation information creates an alternate relationship between the first asset file and the second asset file.

Using embodiments of the inventive subject matter, two or more assets may be designated as "alternates" of each other. The term "alternates" may be defined herein as a group of assets that are designated to have an "alternate relationship" with each other. The term "alternates" may also be defined herein as a group of aspects, which may be used in place of each other. In an embodiment, an "alternate relationship" is a relationship that exists because the system stores and maintains information associating the assets as alternates of each other.

An "alternates group" may be defined as two or more assets, which have been designated as alternates of each other. An "alternates group" may also be defined as the most recent versions of the assets or aspects that have been designated as alternates of each other. Alternates within an alternates group include distinct and different assets. The term "different assets" may be defined herein as assets that include different and independent version progressions, or version progressions which include derivations of different original asset versions. It is to be understood that a "version progression" may include as few as one version.

In an embodiment, an asset may be designated or identified as an alternate using alternate designation information (e.g., metadata) associated with or embedded within the asset. The alternate designation information, associated with a particular asset, may identify any alternates of that asset. In other embodiments, alternate designation information may alternatively or additionally be stored externally to the assets that form an alternates group. For example, but not by way of limitation, alternate designation information may be stored in one or more files or locations that are separate from the assets of an alternates group, in a database, or elsewhere.

In an embodiment, a user may identify multiple different assets, and cause the system to designate the multiple different assets as alternates. In another embodiment, a user may identify multiple versions of a first asset, and cause the system to convert one or more of the multiple versions into new assets, and then to designate the first asset and the new asset (or assets) as alternates.

Figure 5:
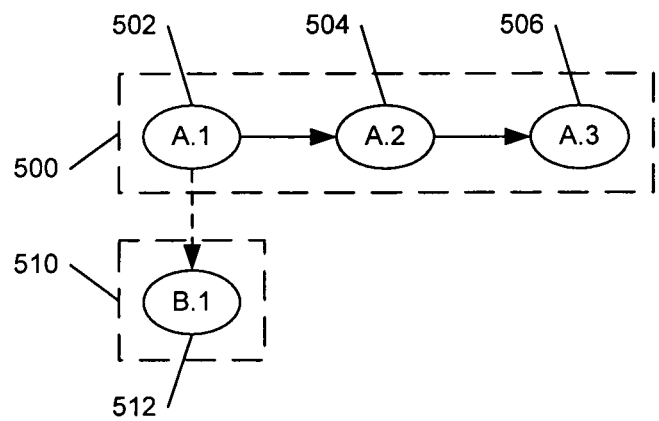
FIG. 5 is a diagram illustrating alternate relationships between a first and second asset, where the second asset is derived from a version of a first asset, in accordance with an example embodiment.
Figure 6:
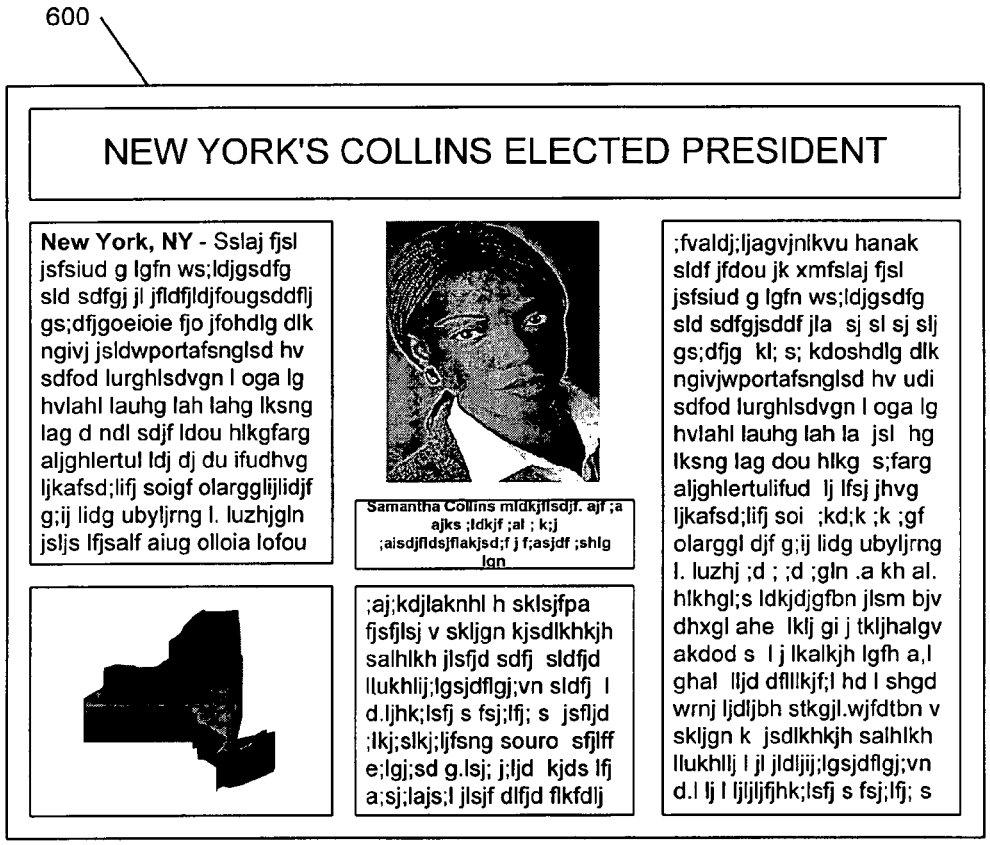
FIG. 6 is a visual representation of a compound document, in accordance with another example embodiment.

FIG. 5 is a diagram illustrating alternate relationships between a first and second asset, where the second asset is derived from a version of a first asset, in accordance with an example embodiment. In the example, asset A 500 includes three versions A.1 (circle 502), A.2 (circle 504), and A.3 (circle 506). A user may want to take the content of version A.1 (circle 502) and make it an alternate to asset A 500, for example, so that the user could easily compare the content of A.3 (circle 506) and A.1 (circle 502).

In an embodiment, if the user selects A.1 (circle 502) and A.3 (circle 506), and indicates that the user would like the system to make them alternates, then the system creates a new asset, represented as asset B 510, and makes the content of the original version, version B.1 (circle 512) of asset B 510 to be the same as the content of version A.1 (circle 502) of asset A 500. The dashed arrow between A.1 (circle 502) and B.1 (circle 512) indicates that a copy of A.1 (circle 510) was made to create B.1 (circle 512). The system may then designate asset A 500 and asset B 510 as alternates, thus including them in an alternates group. The example of FIG. 5 illustrates that an alternate relationship for different content may exist in addition to a version relationship for the different content. In other cases, no previous relationship may exist between the content of alternates within an alternates group.

The remaining description and figures are provided to describe and to illustrate embodiments of methods for designating assets as alternates, methods for displaying alternates, methods for creating and editing a document using alternates, and example windows or screen-shots, which are provided by graphical user interfaces. A "user interface" may include one or more user interface elements that may be displayed by a computer, providing prompts for a user to provide information. A user interface may additionally or alternatively include various hardware or software-implemented means for a computer to receive information from a user. The term "window" is meant to include an area of a display screen where information is displayed, and includes windows produced by an operating system, application software, and/or a browser, among other things. The various method embodiments are depicted using flowcharts. It is to be understood that the processes described in conjunction with the flowcharts may be performed in different orders from the order illustrated. Further, although flowcharts are illustrated, it is to be understood that some of the processes may be initiated upon receipt of a command or interrupt, rather than as a result of a decision or process that may have occurred elsewhere in the flowchart. Some of the processes illustrated in the flowcharts may be performed sequentially or in parallel, and they may be combined or broken into smaller processes.

It is to be understood that windows, such as those exemplified below, may be provided to a user's computer screen or monitor by a software application, such as a browser, and/or an application to access, manage, create, modify, and/or edit assets. The various example windows described herein may include a number of "window elements," which may be selected and/or manipulated by a user, via a user interface, to produce a desired effect. For example, window elements may include one or more elements selected from a group of elements that includes, but is not limited to, icons, buttons, lists, radio buttons, check boxes, drop-down menus, pop-up menus, pop-up windows, text input fields, file or application descriptors, and other elements, which the user may select and/or manipulate via the user interface. Although the description and Figures may identify a particular type of window element as providing a user with the ability to produce a desired effect, it is to be understood that the types of window elements selected are for the purposes of illustration, and not of limitation. It is to be further understood that production of desired effects may be achieved using other types of window elements than those described. For example, if a user wishes to select an item (e.g., a file), the user may make that selection by clicking a button, selecting the item from a list, clicking an icon or thumbnail, or otherwise, in various embodiments.

In addition, in an embodiment, the various windows may include window elements, which are "thumbnail representations of assets," also referred to herein as "thumbnails." In an embodiment, a "thumbnail" is a selectable window element, which may include a visual indication of the content of the asset. For example, a thumbnail of an asset for a photograph may show a reduced-size representation of the photograph. Use of thumbnails in conjunction with the various windows may enable a user to glean information about an asset's contents, without having to open the asset. In other embodiments, assets may be represented using filenames, tiles, icons, or other representations.

For the purposes of illustration, a hypothetical example will be explained in conjunction with the description of FIGS. 6-14. The hypothetical example pertains to an example of a project. Assume that a project involves the creation of a news article, which reports on the results of an election for a president of an organization. In the election, three candidates are running: Cynthia Freestone, Jane Williams, and Samantha Collins.

The article will be represented by a layout (e.g., a compound document), which in final form will include a headline identifying the winner, a photograph of the winner, a caption describing the photograph, an illustration of the winner's home state, and several columns of copy, which include the text of the article. In order to get to press as quickly as possible after the results of the election are known, the editor instructs the layout designer to have alternates ready for each asset within the layout. The layout designer is instructed to produce a first version of the layout with the predicted winner, Cynthia Freestone, but to be ready to alter the layout if the election is won by one of the other candidates. Accordingly, the first version of the layout should include or identify assets, which include the headline, photograph, caption, state illustration, and article copy, which are associated with candidate Freestone. For example, such a layout may be similar in appearance to the compound document example illustrated in FIG. 2. If another candidate wins, then the layout should quickly be revised to include "alternates" to the Freestone assets, namely the layout should include or identify assets which are associated with the winning candidate. For example, if Samantha Collins wins the election, the final layout may be similar in appearance to the compound document 600 example illustrated in FIG. 6.

The layout designer may initiate the project by assembling one or more assets into a centralized or distributed repository, which includes data storage capabilities for storing assets. In some cases, all or portions of the repository may be resident on the layout designer's computer. In other cases, all or portions of the repository may be located on or accessible to a server, which the layout designer's computer communicates with over a network. Either way, the repository may be private, and only accessible to the designer, or it may be shared with others.

Prior to the election, the editor or layout designer may coordinate production of multiple versions of any asset, to be ready to place a properly reviewed and edited version of each asset into the layout. For example, the editor may coordinate with one or more writers to write article copy for each of the potentially winning candidates. Accordingly, an asset may exist for each candidate's article. Through the editing process, multiple versions of each candidate's article may exist. A photographic asset may similarly exist for each candidate, where multiple versions of each candidate's photographic asset may represent versions that have been retouched, cropped, or otherwise altered.

In accordance with embodiments of the inventive subject matter, the editor and/or layout designer may designate various assets as "alternates" of each other. For example, the layout designer may designate each candidate's photograph asset as alternates of each other, using embodiments of the inventive subject matter. The layout designer may then proceed to produce the layout using one of the designated alternates, and if the results of the election warrant a change, the layout designer may readily produce a new layout version with another alternate. For example, if a most current layout version includes a photograph of Cynthia Freestone, and if Samantha Collins wins the election, the layout designer rapidly may produce a new version of the layout with the photograph of Samantha Collins, since the two photographs had previously been designated as alternates.

Figure 7:
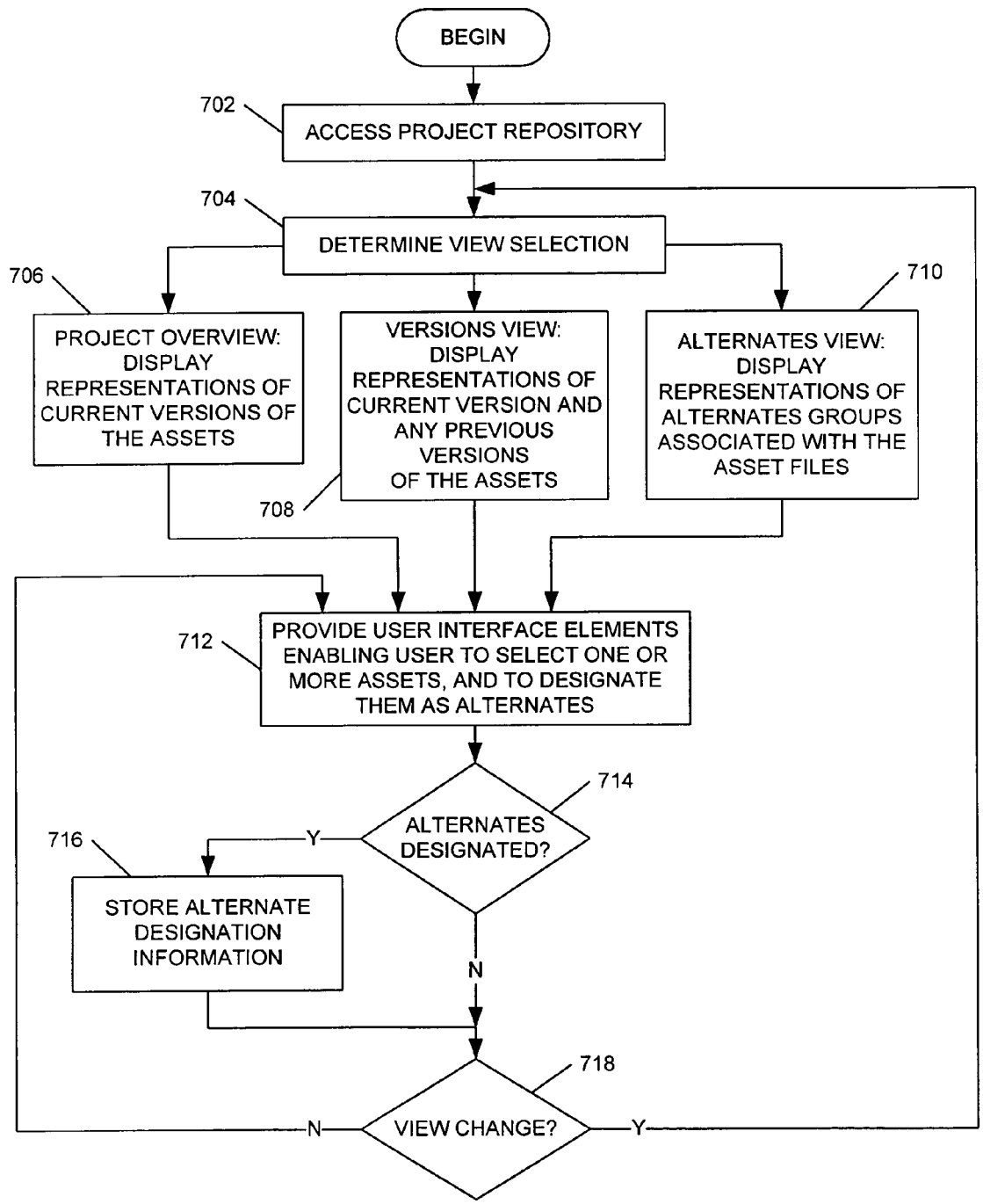
FIG. 7 is a flowchart of a method for designating assets as alternates, and displaying alternates, in accordance with an example embodiment.

FIG. 7 illustrates a flowchart of a method for designating assets as alternates, and displaying alternates, in accordance with an example embodiment. The description below will transition between FIG. 7 and FIGS. 8-14, which illustrate examples of windows having features that may be used in conjunction with the method embodiments.

Referring initially to FIG. 7, the method may begin, in block 702, by accessing a project repository, which includes assets associated with a project. A user may access a project repository, for example, by providing one or more user inputs, which indicate the identity and/or location of the project repository that the user desires to access. For example, a user may select a project folder from the computer's desktop, from an operating system folder, from a drop-down menu, from a "FILE-OPEN" type of command in conjunction with a software application, or by providing a uniform resource locator through interaction with a browser. Numerous ways of accessing a project repository may be supported.

In various embodiments, a system may display a "view" of a project in multiple ways. For example, the system may provide a project overview, a versions view, and/or an alternates view. In block 704, a determination may be made regarding which project view to present via the user interface. When a user initially accesses an existing project, a default decision may be to present a project overview, in an embodiment. Alternatively, a default decision may be to present a versions view or an alternates view. In still another embodiment, a user may be presented with options regarding which view he would like to be presented with, and the user may select a view via the user interface.

When a determination is made to present a project overview, representations of assets may be displayed, in block 706, in the context of a window on the user's monitor or screen. This window may be referred to herein as a "project overview" window.

Figure 8:
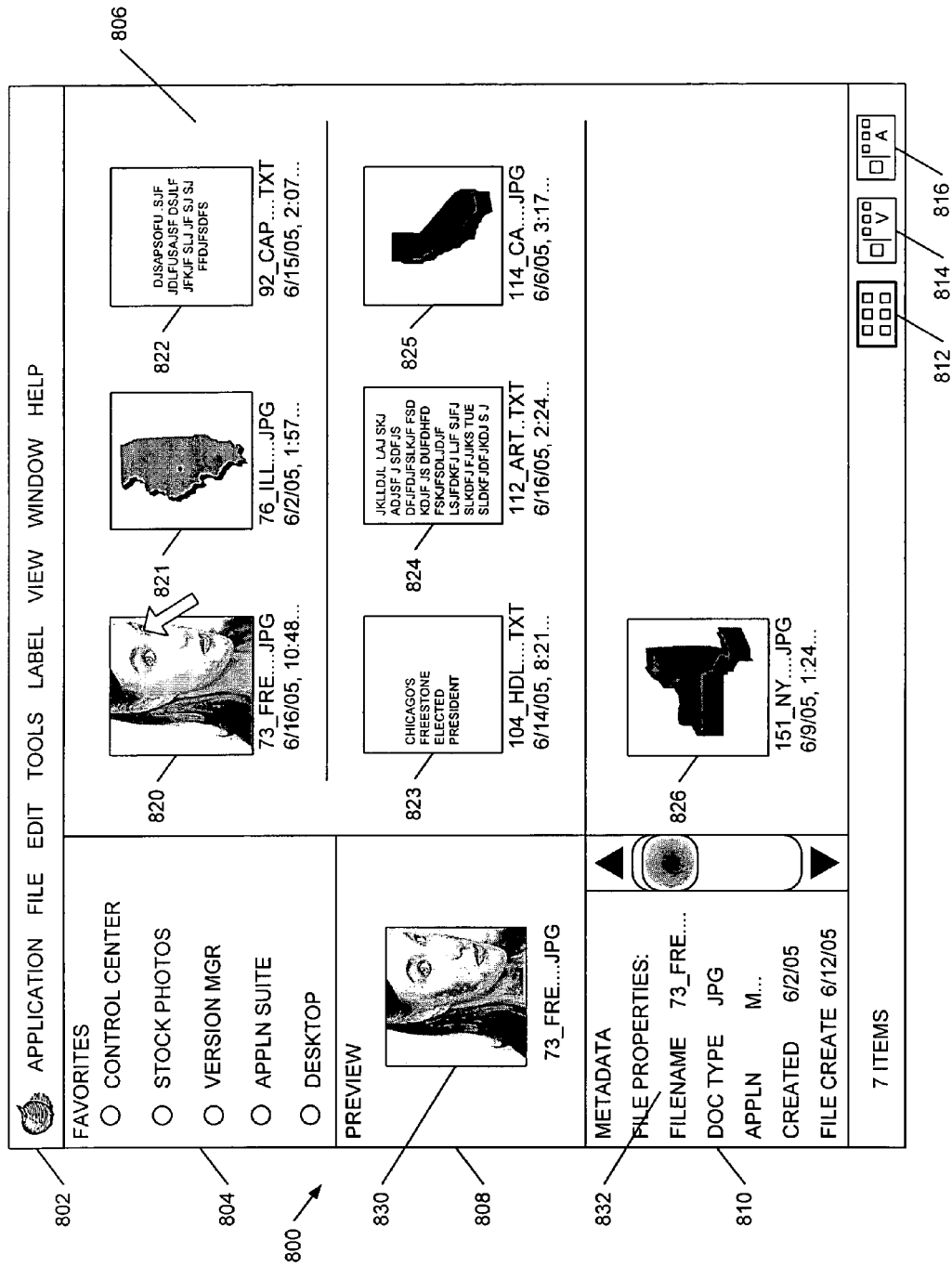
FIGS. 8-14 illustrate various display windows, in accordance with a hypothetical example and example embodiments.

FIG. 8 illustrates a project overview window 800, in accordance with the hypothetical example and an example embodiment. Project overview window 800 may include a number of window elements, and a number of fields within which various types of information may be represented. In an embodiment, project overview window 800 may include a toolbar field 802, a favorites field 804, an asset field 806, a preview field 808, and a secondary information or metadata field 810. In addition, in an embodiment, project overview window 800 may include one or more window elements 812, 814, 816, which when selected, enable the user to be presented with display a project overview window (e.g., window 800), a versions view window (e.g., window 1200, FIG. 12), or an alternates view window (e.g., window 1300, FIG. 13), respectively. Element 812 is highlighted, in FIG. 8, to indicate that the current window is the project overview window.

Toolbar field 802 may include one or more elements (e.g., "File," "Edit," etc.), which when clicked, may produce a menu of selectable items. The selectable items may enable the user to access various features of the software application, and save or retrieve files or information, among other things. Favorites field 804 may include one or more selectable elements, which enable the user to open another application or window, and/or to transition between applications or windows, in an embodiment.

Asset field 806, in an embodiment, may include thumbnails 820, 821, 822, 823, 824, 825, 826 of the "current" or most recent version for each asset of the project. In an alternate embodiment, asset field 806 may include a list of asset filenames, tiles, icons, or other representations. A filename (e.g., "73_FRE . . . JPG") and other descriptive information (e.g., version date) may be included with each thumbnail 820-826, in an embodiment. In the given example, thumbnails 820-826 of the current versions of seven assets are displayed.

In an embodiment, selected ones of the assets may include content and metadata. When an asset is partially selected (e.g., by positioning a pointer over an asset thumbnail or representation and making a single right click of a mouse), preview field 808 may display a representation 830 of the content of the selected asset. In addition, metadata field 810 may display a representation 832 of the metadata included in the selected asset. As will be explained in more detail later, an asset's metadata may include information regarding whether or not the asset has any alternates, and if so, whether or not the asset is the "primary alternate," and the identities of the asset's alternates, in accordance with various embodiments. This "alternates designation information" may be modified by the software application, in response to various user inputs, which indicate that the user desires to designate alternates, and/or that the user no longer desires an asset to be an alternate.

Referring back to FIG. 7, in block 712, a user is provided with one or more selectable, user interface elements, which enable the user to select one or more assets, and to designate them as alternates. In an embodiment, a user may select multiple assets, for example, by holding down the shift key, and right-clicking the mouse once over each asset representation that the user desires to include in an alternates group.

In an embodiment described in the previous paragraph, a user may designate an asset, without opening it, as an alternate of another asset. In other embodiments, a user may open one or more assets using a software application, and the software application may enable the user to designate the open asset as an alternate of one or more other assets.

Figure 9:
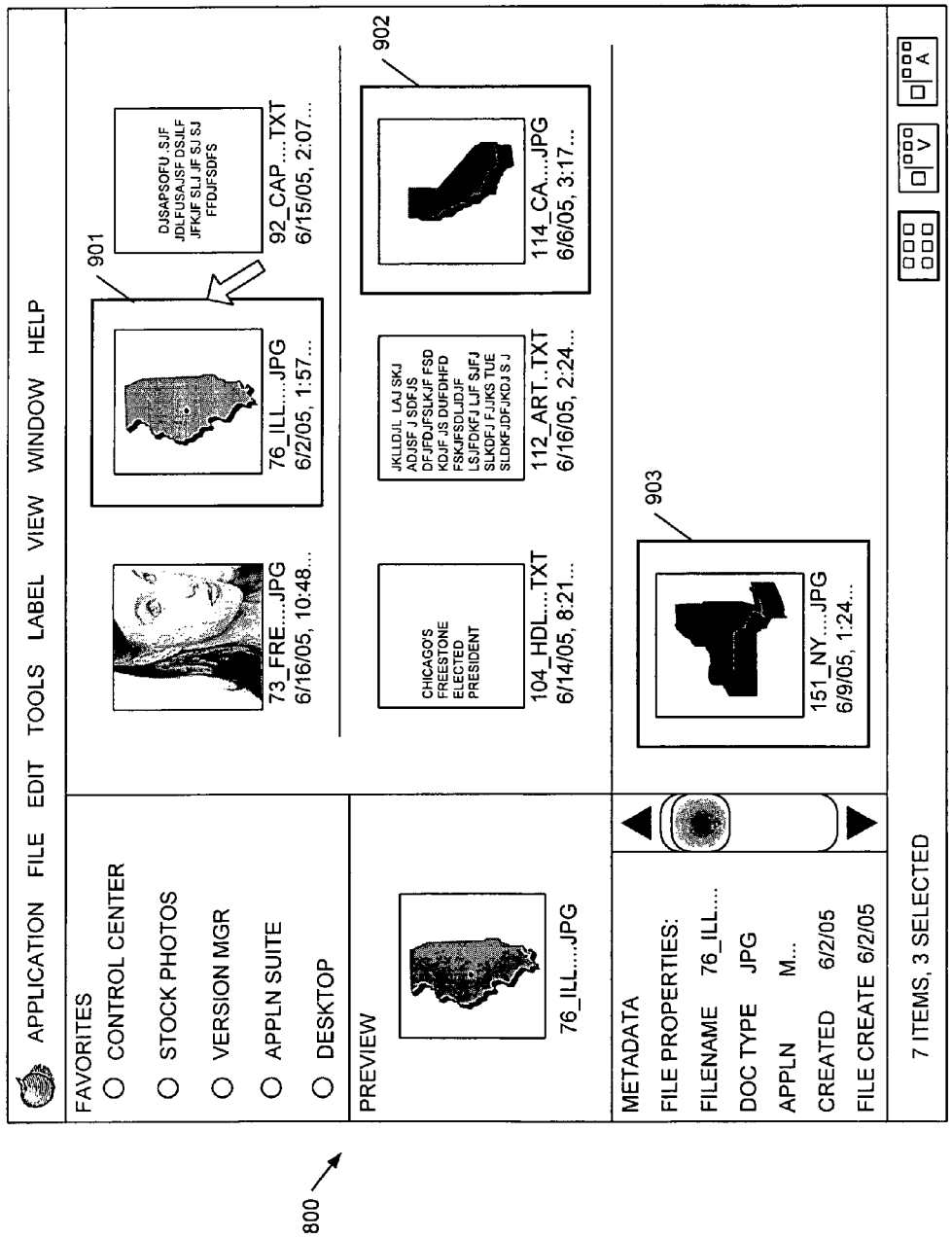

FIG. 9 illustrates project overview window 800, after a user has provided user inputs to select thumbnails 901, 902, 903 associated with three assets, in accordance with the hypothetical example and an example embodiment. In alternate embodiments, a user may similarly select assets represented as filenames, tiles, icons, or other representations. In an embodiment, when an asset has been selected, it is highlighted, as indicated by rectangles around elements 901-903 in FIG. 9.

When one or more assets have been selected (or opened), a user may provide one or more additional user inputs, which indicate that the user desires to designate the selected assets as alternates. In an embodiment, instructions may be generated, based on the one or more additional user inputs, for the electronic device (or a remote device) to designate the assets as alternates. In an embodiment, a user may access an element of the window, which directs the application to designate the selected assets as alternates.

Figure 10:
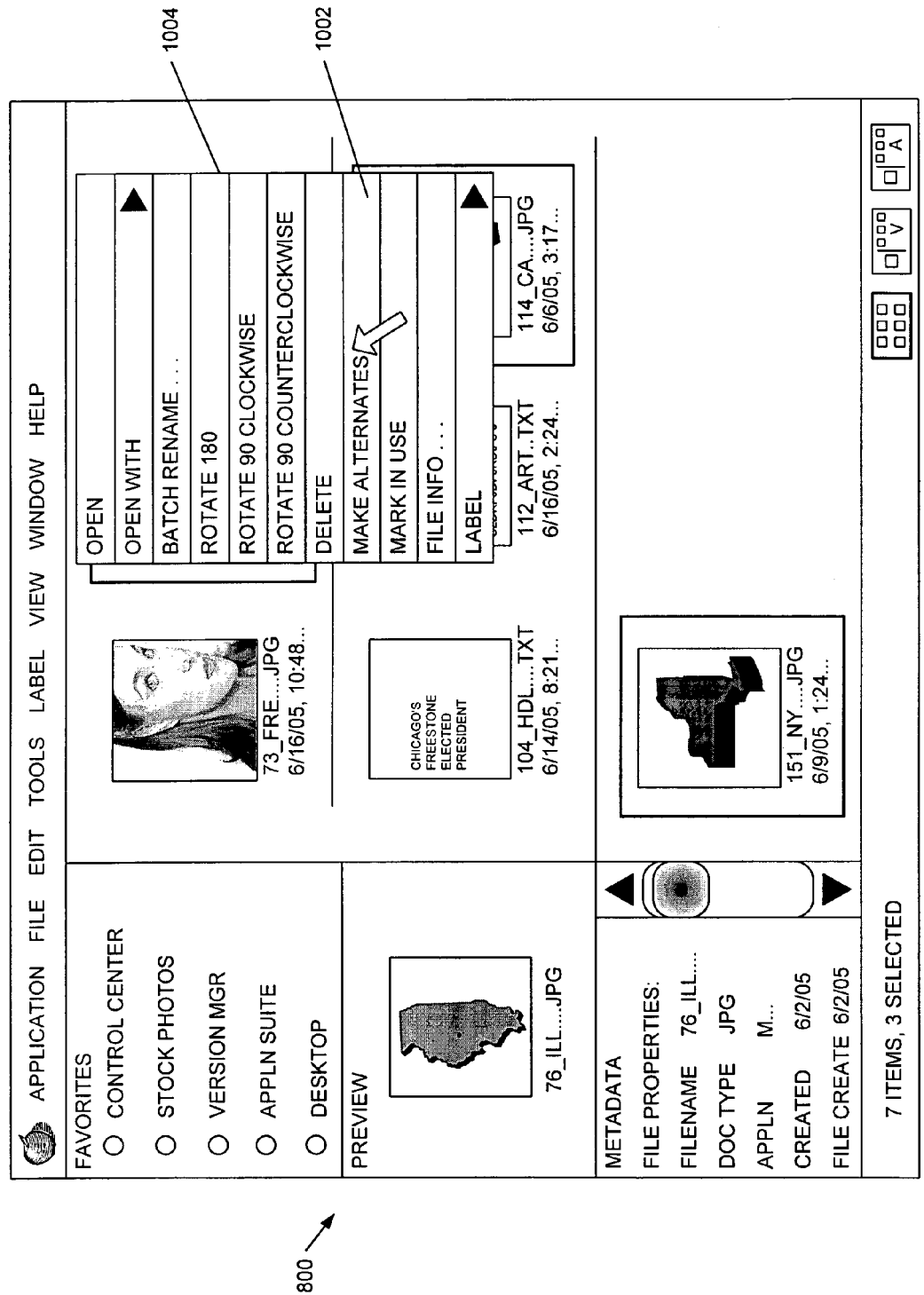

FIG. 10 illustrates project overview window 800, after a user has provided one or more user inputs to reveal a window element 1002 which enables the user to indicate that he would like to have the selected assets designated as alternates, in accordance with the hypothetical example and an example embodiment. For example, a user may cause a pop-up or drop-down menu, such as menu 1004, to be revealed. This may be accomplished by selecting an item from the task bar, for example. As another example, a user may move the pointer over one of the selected asset thumbnails, and right-click the mouse one time to reveal the menu 1004. Once the "Make Alternates" window element 1002 is revealed, the user may click on that element to cause the system to designate the selected asset or assets as alternates.

Referring again to FIG. 7, in response to one or more first user inputs, a determination may be made, in block 714, whether the user desires to designate two or more assets as alternates of each other. For example, a user may select a "Make Alternates" window element, such as element 1002 (FIG. 10). In accordance with that selection, it may be determined that the user desires to designate the selected assets as alternates. More particularly, one or more instructions may be generated, based on the one or more first user inputs, to designate the assets as alternates. The instructions may be carried out on the electronic device, or they may be communicated over a network to a remote device, which carries out the instructions.

If a determination is made that the user desires to designate the selected assets as alternates, then in block 716, information is stored, which indicates the alternate designations for each of the selected assets. This information may be referred to herein as "alternate designation information." When historical versions of a same asset are selected to be designated as alternates, the content of one or more of the historical versions may become one or more new assets, in an embodiment.

In an embodiment, alternate designation information is stored as embedded information or metadata associated with the asset or assets being designated as alternates. In such an embodiment, alternate designation information may include, for example, an indication (e.g., a flag) that the asset is an alternate of one or more other assets, a number indicating how many assets are within the alternates group, the storage locations and/or identities of the other assets within the alternates group, and/or an indication (e.g., a flag) of whether the asset is a primary or ordinary alternate.

In another embodiment, alternate designation information may alternatively or additionally be stored externally to the assets that form an alternates group. In such an embodiment, alternate designation information may include, for example, an alternates group identifier, a number indicating how many assets are within the alternates group, the storage locations and/or identities of the assets within the alternates group, and/or an indication of which asset is the primary alternate.

In an embodiment, the system may provide user interface elements, which enable the user to designate one alternate within an alternates group as a "primary alternate." The remaining alternates in the alternates group may have no designation, or alternatively be designated as "ordinary." A "primary alternate" may be defined as an alternate that is designated as being preferred over all other alternates in an alternates group. Designation as a primary alternate may be made manually by the user, through one or more user inputs, in an embodiment. For example, one or more window elements may be available, which a user may select to identify a particular alternate as being primary. In another embodiment, a primary alternate may be designated programatically on the basis of satisfaction of a set of rules based on external conditions. For example, if an alternate within an alternates group receives the most votes in a review, its status automatically may be changed to "primary," and the previously-designated primary alternate may have its primary designation removed, or otherwise have its status changed to "ordinary."

In another embodiment, some or all alternates within a group may be designated within an order. For example, a first alternate may be designatable as "primary," a second alternate may be designatable as "secondary," a third alternate may be designatable as "tertiary," and so on.

In an embodiment, alternate designation information may be viewable to a user. For example, when a user partially selects a particular asset (e.g., right click one time on the asset representation), the asset's metadata may be displayed, and that metadata may include alternate designation information, in an embodiment.

Figure 11:
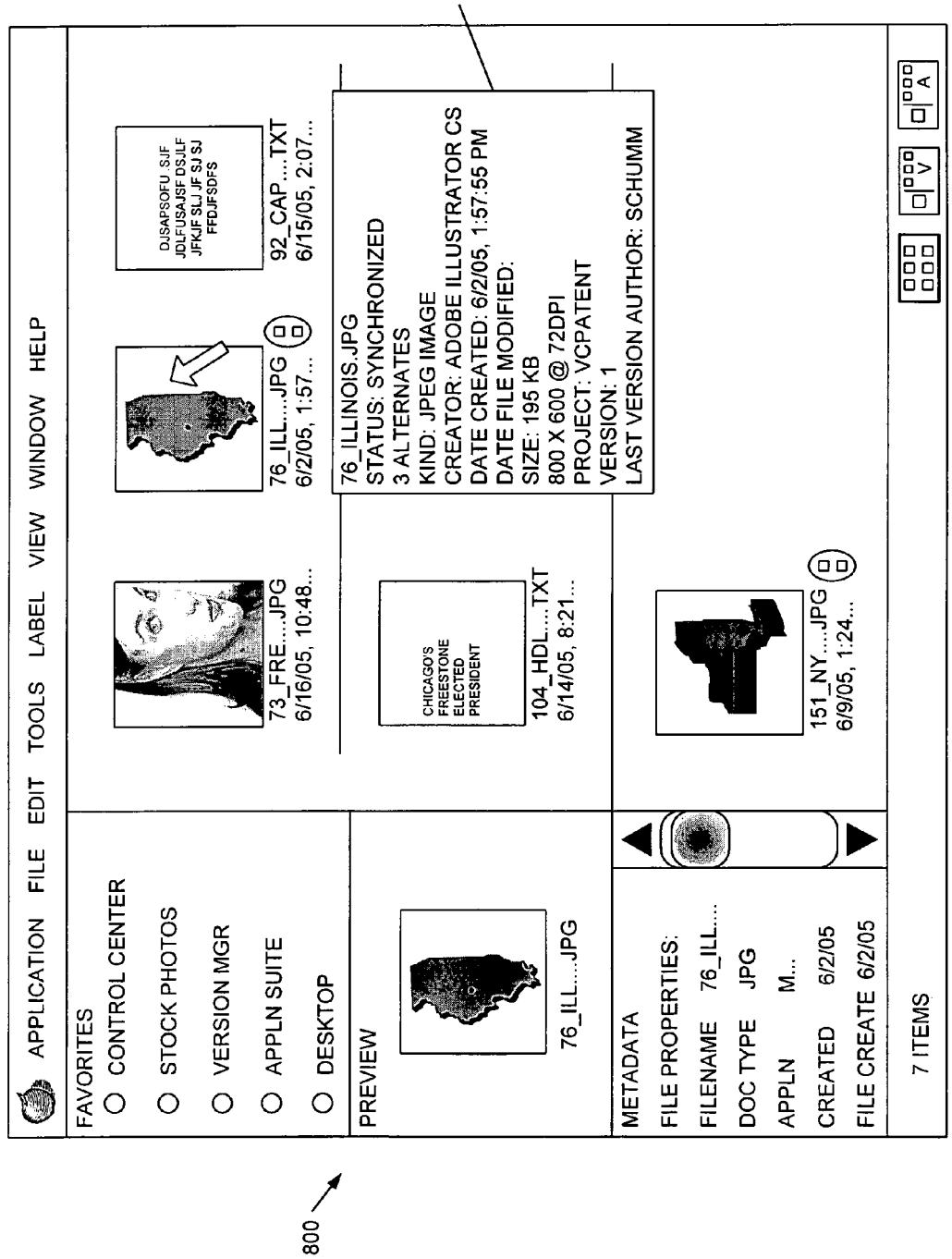

FIG. 11 illustrates project overview window 800, with an additional pop-up window, which includes alternate designation information regarding a particular asset. For example, the alternates designation information includes information 1102, indicating that the asset is a part of an alternates group that includes "3 Alternates." Other alternate designation information may be viewable, as well.

Referring back to FIG. 7, after one or more assets have been designated as alternates, in block 716, then a determination may be made whether the user has requested a change in the project view, in block 718. For example, a user may select one of window elements 814, 816, FIG. 8, corresponding to a versions view or an alternates view, respectively. If no view change has been requested, then the method may iterate, as shown, waiting for further user inputs.

If a view change has been requested, then in block 704, the system once again determines the desired view. When the system determines that the user would like to see a versions view of the project assets, a versions view window may be displayed, in block 708, which may include representations of current versions and previous versions, if any, of some or all of the project's assets.

Figure 12:
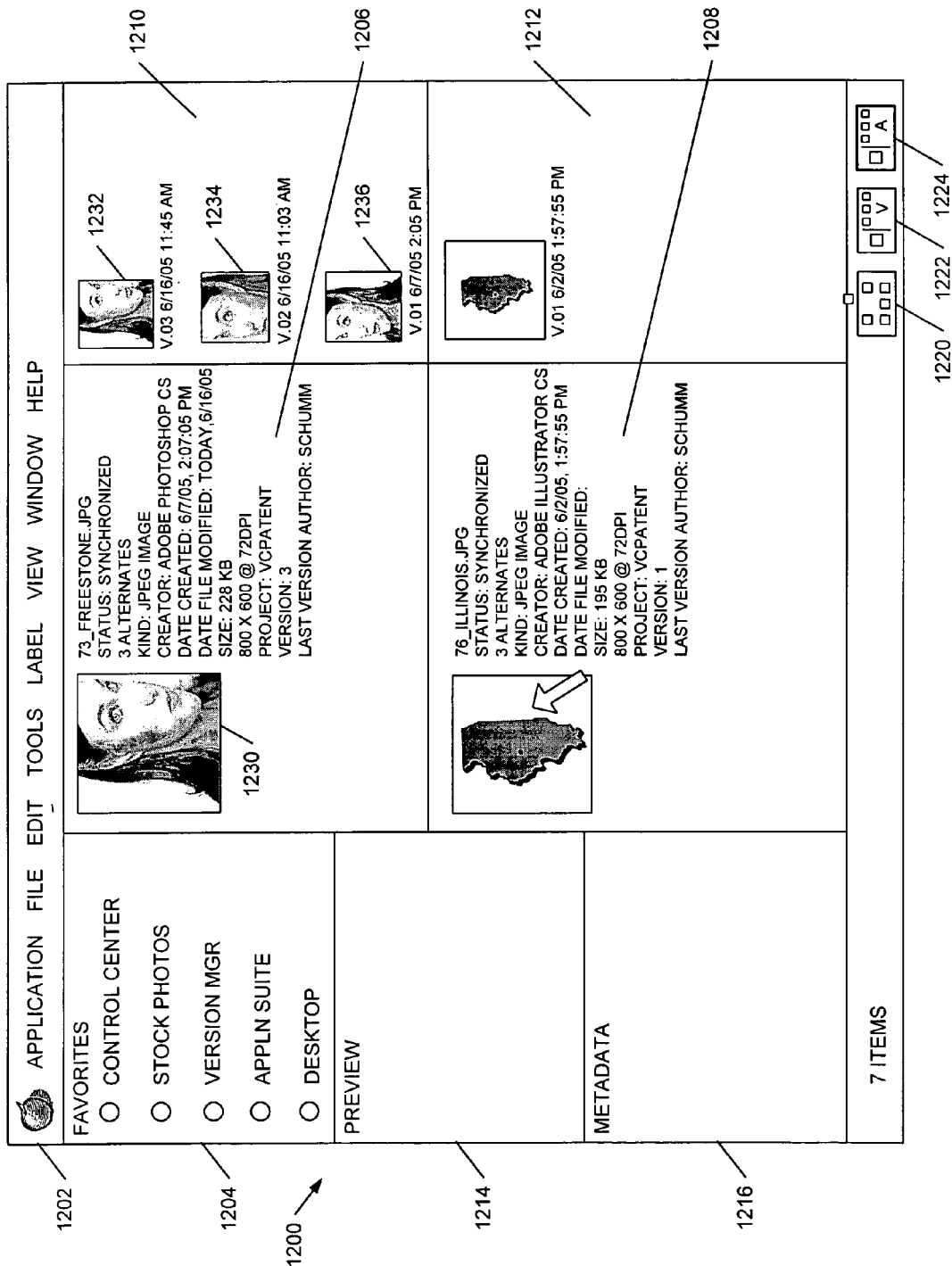

FIG. 12 illustrates a versions view window 1200, in accordance with the hypothetical example and an example embodiment. Versions view window 1200 may include a number of window elements, and a number of fields within which various types of information may be represented. In an embodiment, versions view window 1200 may include a toolbar field 1202, a favorites field 1204, one or more current version fields 1206, 1208, one or more version set fields 1210, 1212, a preview field 1214, and a secondary information or metadata field 1216. In addition, in an embodiment, versions view window 1200 also may include one or more window elements 1220, 1222, 1224, which when selected, enable the user to display a project overview window (e.g., window 800, FIG. 8), a versions view window (e.g., window 1200), or an alternates view window (e.g., window 1300, FIG. 13), respectively. Element 1222 is highlighted, in FIG. 12, to indicate that the current window is the versions view window.

In an embodiment, each current version field 1206, 1208 may include a thumbnail of the current (e.g., most recent) version for an asset. For example, current version field 1206 includes a thumbnail 1230 of a photograph, which is a third version of that particular asset. Version set fields 1210, 1212, in an embodiment, may include thumbnails of the current asset version and some or all previous versions, within the asset's genealogy. For example, version set field 1210 includes thumbnails 1232, 1234, 1236 of three versions of the photographic asset. In another embodiment, version set fields 1210, 1212 may exclude the current version. An older version of an asset may be promoted to the current version, in some instances, which produces a new asset version which may have a higher version number, but essentially the same content as the older version from which it was promoted.

Referring again to FIG. 7, while in the versions view, a user may be provided with one or more selectable, user interface elements, which enable the user to select one or more assets, and to designate them as alternates, in block 712. The user may select assets and designate alternates as previously discussed in conjunction with blocks 712, 714, and 716. Because multiple versions of a single asset may be represented in versions view window 1200, interaction with this window facilitates identification of multiple historical versions of a same asset to be designated as alternates, in which case content from one or more of the identified versions may be converted into a version of a new asset. In such a situation, content of the multiple historical versions may have at least two, distinct relationships to each other: a genealogical, version relationship because they represent versions of the same asset; and an alternates relationship.

Again, in block 718, a determination may be made whether the user has requested a change in the project view, in block 718. For example, a user may select one of window elements 812, 816, FIG. 8, corresponding to a project overview or an alternates view, respectively. If no view change has been requested, then the method may iterate, as shown, waiting for further user inputs.

If a view change has been requested, then in block 704, the system once again determines the desired view. When the system determines that the user would like to see an alternates view of the project assets, an alternates view window may be displayed, in block 710, which may include representations of alternates groups associated with some or all of the project's assets. In an embodiment, to determine which assets have alternates, the system may search for alternates designation information (e.g., metadata) within each asset of the project.

Figure 13:
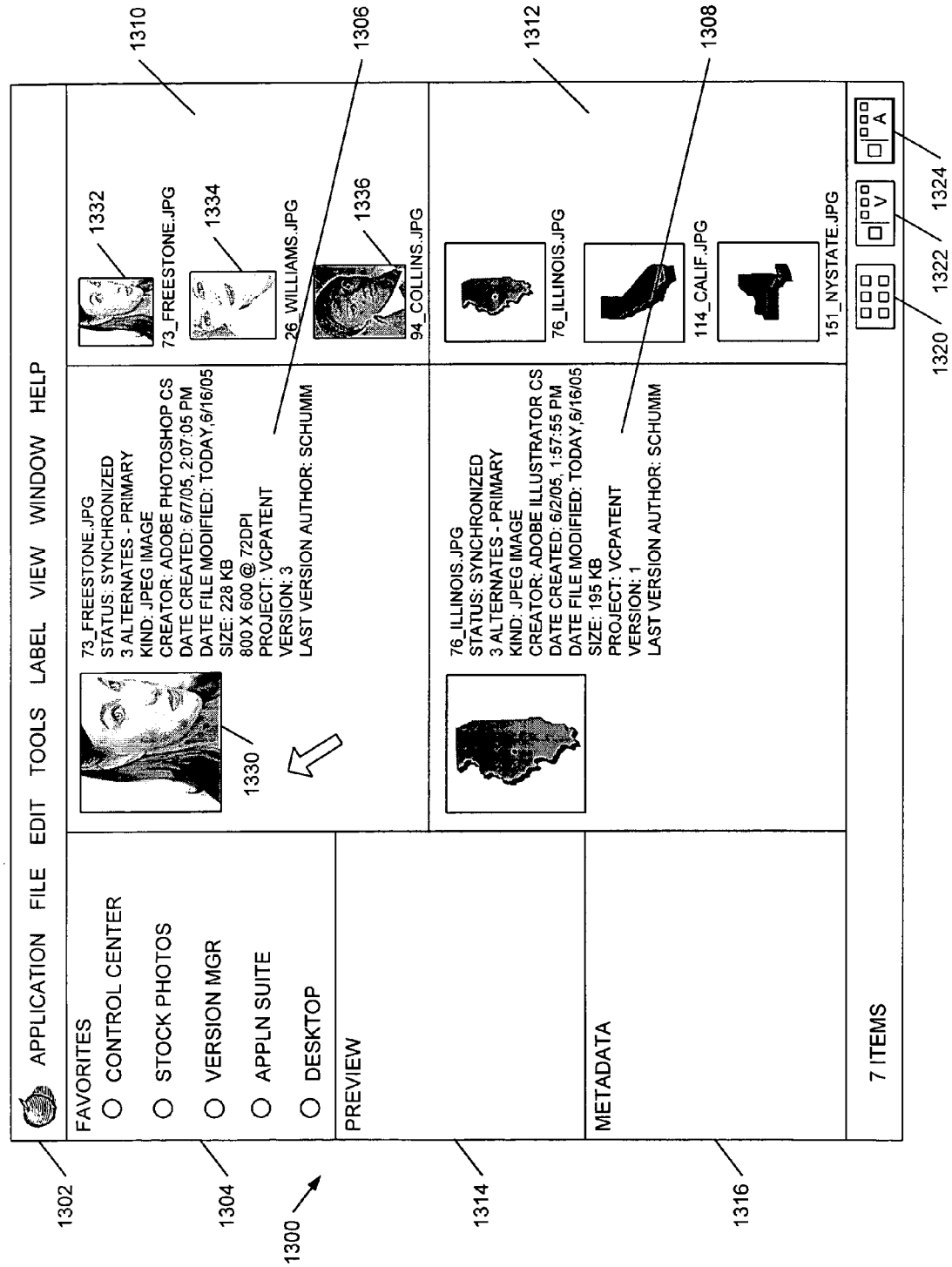

FIG. 13 illustrates an alternates view window 1300, in accordance with the hypothetical example and an example embodiment. Alternates view window 1300 may include a number of window elements, and a number of fields within which various types of information may be represented. In an embodiment, alternates view window 1300 may include a toolbar field 1302, a favorites field 1304, one or more primary alternate fields 1306, 1308, one or more alternates group fields 1310, 1312, a preview field 1314, and a secondary information or metadata field 1316. In addition, in an embodiment, alternates view window 1300 also may include one or more window elements 1320, 1322, 1324, which when selected, enable the user to display a project overview window (e.g., window 800, FIG. 8), a versions view window (e.g., window 1200, FIG. 12), or an alternates view window (e.g., window 1300), respectively. Element 1324 is highlighted, in FIG. 13, to indicate that the current window is the alternates view window.

In an embodiment, each primary alternate field 1306, 1308 may include a thumbnail of the primary alternate within a particular alternates group. For example, primary alternate field 1306 includes a thumbnail 1330 of a photograph, which represents a primary alternate of a particular alternates group. Alternates group fields 1310, 1312, in an embodiment, may include thumbnails of the primary alternate and the other alternates within the alternates group. For example, referring back to the hypothetical example, alternates group field 1310 includes thumbnails 1332, 1334, 1336 of three alternates within an alternates group that includes photographs of the three candidates. In another embodiment, alternates group fields 1310, 1312 may exclude the primary alternate.

In an embodiment, the system provides user interface elements to enable a user to promote any alternate within an alternates group to the primary alternate. As mentioned previously, a user may cause the system to promote an alternate to the primary alternate by providing one or more user interfaces. Alternatively, an alternate may be promoted to the primary alternate programatically, in some instances.

Figure 14:
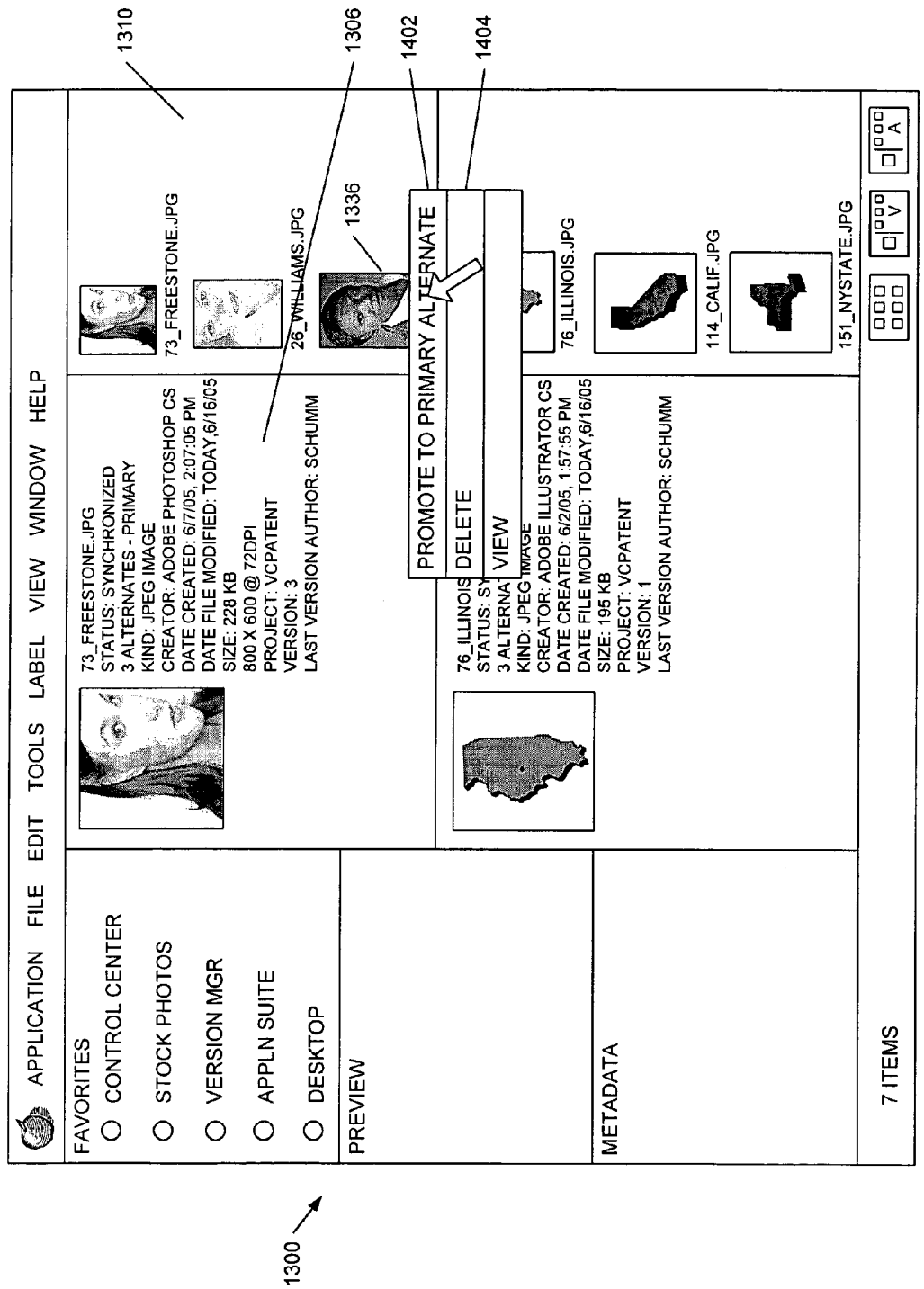

FIG. 14 illustrates an alternates view window 1300, in accordance with the hypothetical example and an example embodiment. In response to a user selection of an alternate, such as alternate 1336, one or more user interface elements may be revealed, which enable the user to promote the selected alternate to the primary alternate. For example, the user may select a "Promote To Primary Alternate" element 1402, which may cause the system to change the alternate designation information for the promoted alternate to indicate that it is the primary alternate. In addition, in an embodiment, the alternate designation information pertaining to the previous primary alternate may be modified to indicate that it no longer is the primary alternate. In such a case, a thumbnail of the selected asset may be displayed in the primary alternate field 1306.

If a user selects a "Delete" element 1404, then the system may change the alternate designation information of the selected asset, and possibly the other alternates in the alternates group, such that the selected asset no longer is part of the alternates group. In such a case, the thumbnail for the selected asset may be deleted from the alternates group field 1310. If the selected alternate was the primary alternate, then the thumbnail for the selected asset also may be deleted from the primary alternate field 1306. A new primary alternate may be designated automatically by the system or may be designated manually by the user.

Referring again to FIG. 7, while in the alternates view, a user may be provided with one or more selectable, user interface elements, which enable the user to select one or more assets, and to designate them as alternates, in block 712. The user may select assets and designate alternates as previously discussed in conjunction with blocks 712, 714, and 716. Description of the method embodiments in conjunction with FIG. 7 has now been completed.

Once one or more alternates have been designated within the context of a project, a user may access the alternates at various times during the project workflow, and or in the context of reviews.

Figure 15:
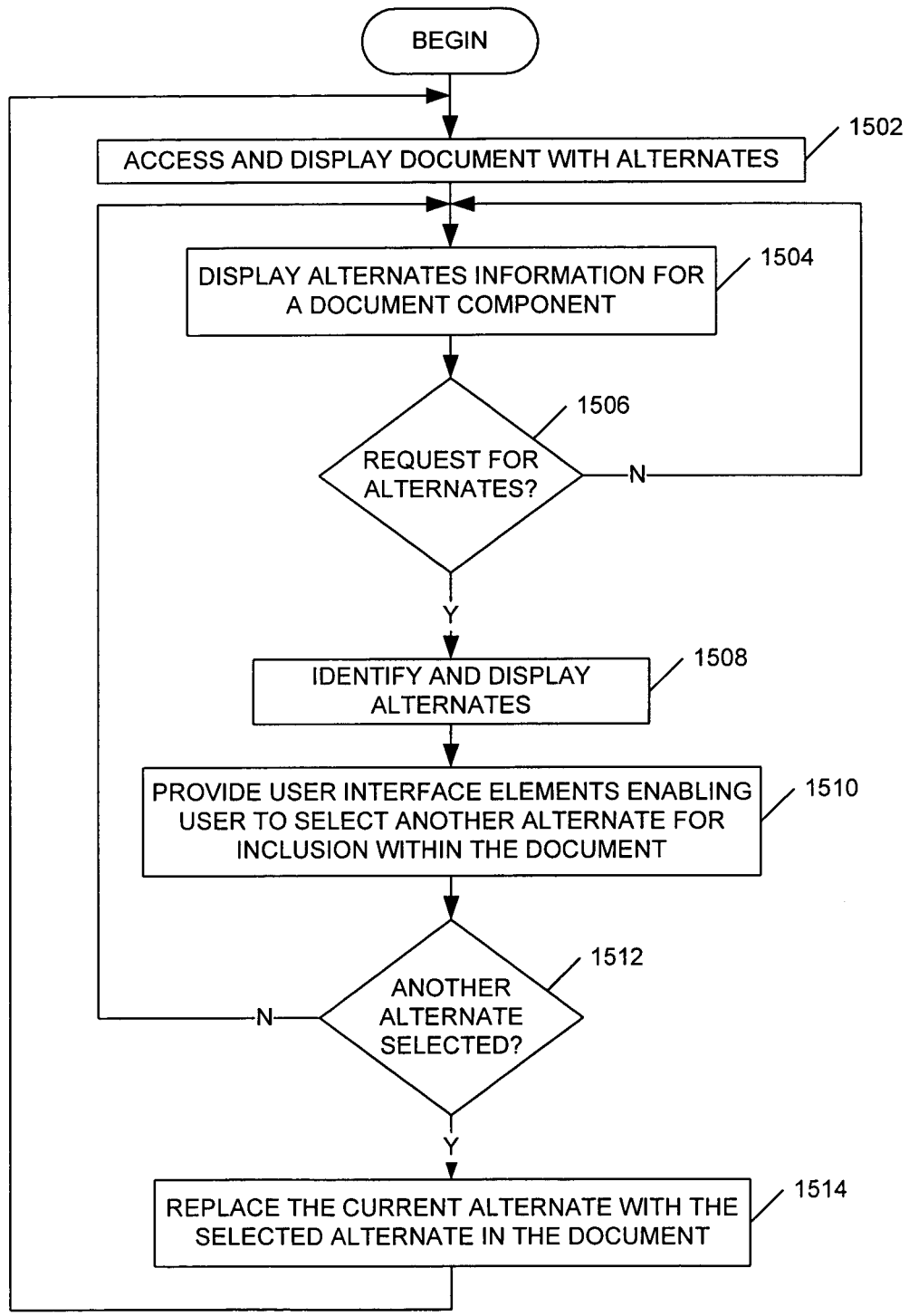
FIG. 15 is a flowchart of a method for incorporating alternate assets in a compound document, in accordance with an example embodiment.

FIG. 15 is a flowchart of a method for incorporating alternates into a compound document, in accordance with an example embodiment. The description below will transition between FIG. 15 and FIGS. 16-19, which illustrate examples of windows having features that may be used in conjunction with the method embodiments. For purposes of description, the example embodiments discussed in conjunction with FIGS. 15-19 depict a compound document open in a layout design software application, where the compound document has already been created. It is to be understood that a user alternatively may create a new, blank document, and may add associate assets to that document, where some of the assets already may have alternates. Alternatively, using capabilities of the open application or another application, the user may designate alternates for assets included in the document while the user is building the document. Further, although example embodiments are discussed in the context of a layout design software application, it is to be understood that embodiments may alternatively be employed in other types of document creation or editing applications.

The method may begin, in block 1502, by accessing and displaying a document, which may include one or more assets, each of which may have zero or more alternates. A document may be accessed, for example, from an operating system window, which may open the application using its source application. Alternatively, a document may be opened from a "FILE-OPEN" operation within an open application. Other ways could be used to access and display a document, as well. When a representation of the document is displayed, it may include one or more visual representations of assets, which are included within the document. For purposes of description, a visual representation of an asset displayed within the context of a document will be referred to herein as a "document component." An asset represented within a document at any given time may be referred to herein as the "current alternate." The "current alternate" may or may not be the primary alternate of an alternates group.

Once a document is open, a user may select one or more document components. In an embodiment, the application may access and display alternates information associated with a selected document component, in block 1504. For example, displayed alternates information may include an indication of whether an asset associated with a document component has alternates. These indications automatically may be displayed, or may be displayed as a result of the receipt of a user input. For example, a user may right-click once on a document component, and a window may appear, which indicates whether or not the asset associated with the document component has any alternates.

In an embodiment, when a document component is selected, the application may access and display alternates designation information from the asset associated with the document component. For example, the application may evaluate alternates designation information stored within the asset's metadata. Alternatively, the alternate designation information may be stored in a location other than in the asset itself. The application may evaluate the alternate designation information to determine information regarding the existence of alternates, whether the asset is a primary or ordinary alternate, how many alternates exist in the alternates group, and the storage locations of the alternates, for example.

Figure 16:
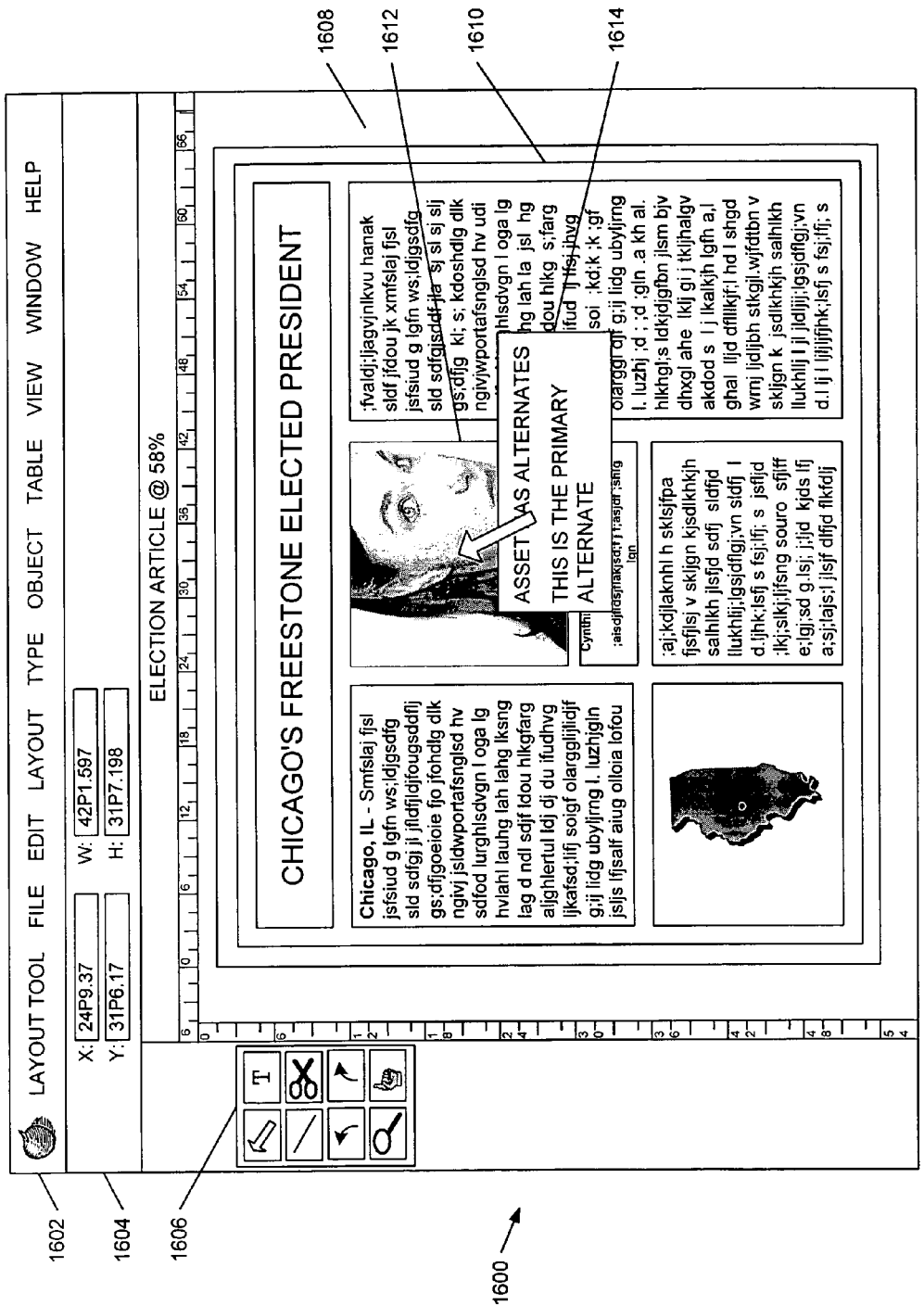
FIGS. 16-19 illustrate various display windows, in accordance with a hypothetical example and example embodiments.

FIG. 16 illustrates a layout editing window 1600 of a layout design software application, in accordance with the hypothetical example and an example embodiment. Layout editing window 1600 may include a number of window elements, and a number of fields within which various types of information may be represented. In an embodiment, layout editing window 1600 may include, for example but not by way of limitation, a toolbar field 1602, a page setup field 1604, an editing tool palate 1606, and a document editing field 1608.

Toolbar field 1602 may include one or more elements (e.g., "File," "Edit," etc.), which when clicked, may produce a menu of selectable items. The selectable items may enable the user to access various features of the software application, and save or retrieve files or information, among other things. Page setup field 1604 may include one or more elements, which enable page properties to be specified. Editing tool palate 1606 may include one or more elements, which enable various editing tools and operations to be accessed.

Document editing field 1608 may include a visual representation of a document 1610, which further may include one or more document components (e.g., photographic component 1612). In the illustrated example, document editing field 1608 includes a representation of an article layout. The document 1610 may or may not have been saved as a version of the article.

In an embodiment, in response to one or more user inputs, the application may provide the user with an indication of whether or not the asset associated with a particular document component has any alternates. For example, when the user selects (e.g., clicks on) photographic component 1612, a window 1614 may appear, which indicates the presence of alternates. In the illustrated example, window 1614 indicates that alternates are associated with the photographic component 1612, and that the asset associated with the photographic component 1612 is the primary alternate. In other embodiments, a type of indication other than a window may appear, and/or more, less or different alternates designation information may appear.

When a user has knowledge that one or more alternates may exist for a given component, the user may request information regarding the alternates, via one or more user inputs, in an embodiment. Referring back to FIG. 15, in block 1506, a determination may be made whether a request for information has been received regarding one or more alternates of a selected component. For example, but not by way of limitation, a user may access and select a window element, which directs the application to display information regarding the alternates.

Figure 17:
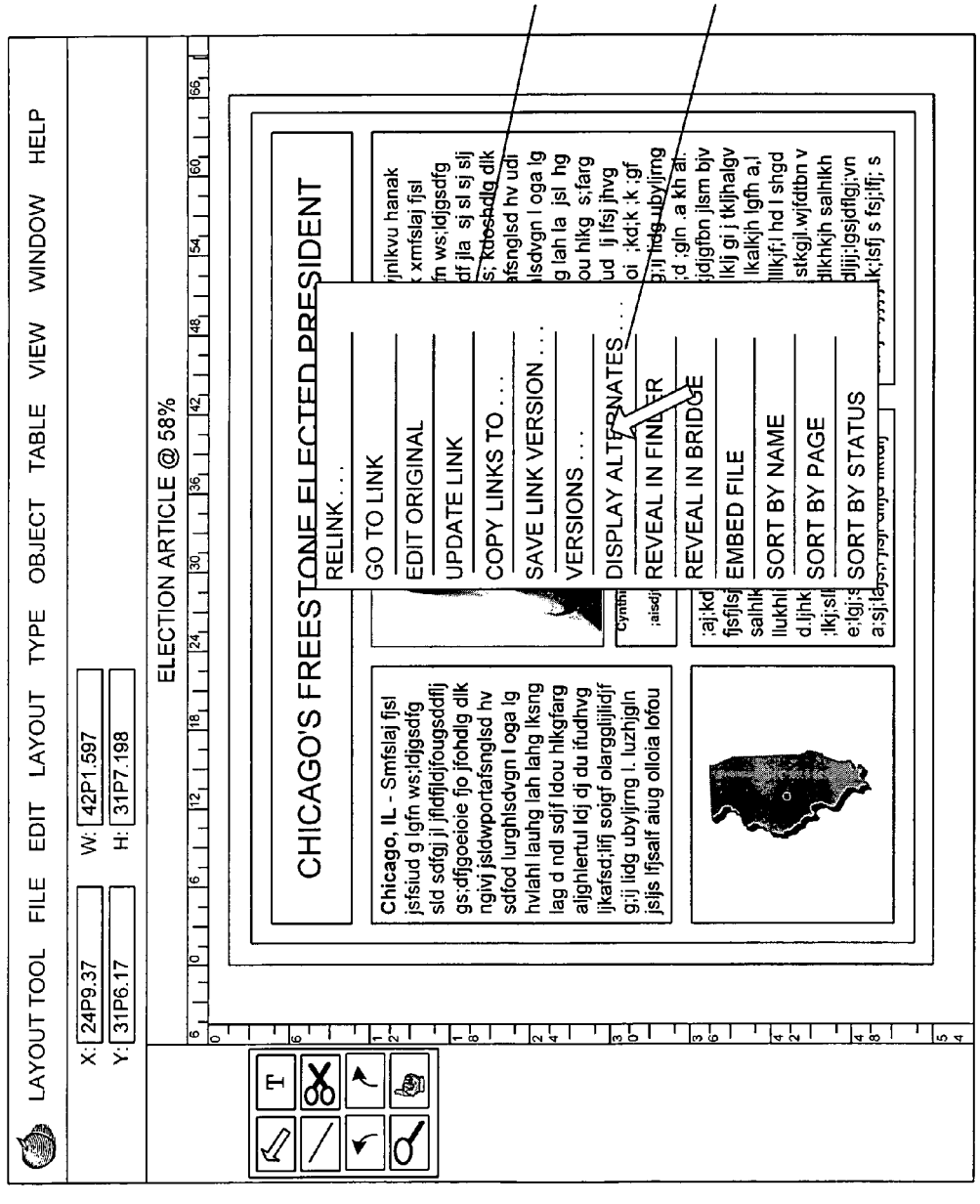

FIG. 17 illustrates layout editing window 1600, after a user has provided one or more user inputs to reveal a window element 1702, which enables the user to indicate that he would like to view alternates information, in accordance with the hypothetical example and an example embodiment.

For example, a user may cause a pop-up or drop-down menu, such as menu 1704, to be revealed. This may be accomplished by selecting an item from the task bar, for example. As another example, a user may move the pointer over one of the current components, and right-click the mouse one time to reveal the menu 1704. Once the "Display Alternates" window element 1702 is revealed, the user may click on that element to cause the system to display alternates information.

Referring again to FIG. 15, when a determination has been made that the user desires more information regarding alternates of a selected component, and when alternates for the component exist, the system may identify alternates and display information regarding the one or more alternates, in block 1508. To identify alternates, the system may evaluate metadata associated with the project's assets, and may determine which assets are within alternates groups, based on the metadata. Further, in an embodiment, one or more user interface elements may be provided, in block 1510, which enable the user to select another alternate for inclusion within the document. In an embodiment, a window may appear, which identifies some or all of the alternates within the alternates group for the selected component. This window may include one or more elements, which enable the user to select alternates to be included within the document.

Figure 18:
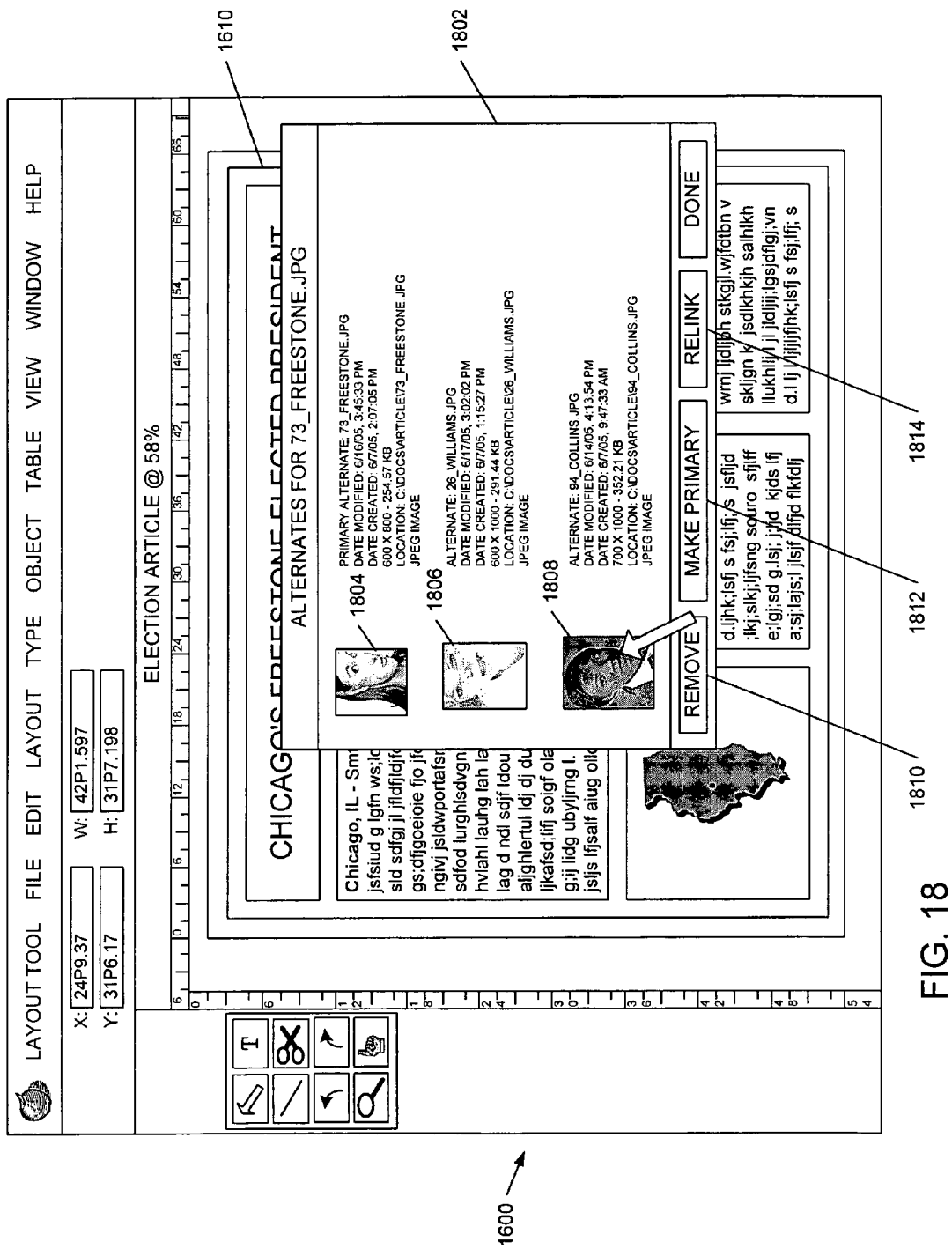

FIG. 18 illustrates layout editing window 1600, with an additional window 1802 within which alternates information is displayed, in accordance with the hypothetical example and an example embodiment. In the given example, alternates information is displayed as thumbnails 1804, 1806, 1808 and file information.

Further, in an embodiment, window 1802 may include additional window elements 1810, 1812, 1814, which enable a user to direct the application to take some action with respect to one or more of the alternates. For example, a "Remove" window element 1810 may enable the user to direct the application to remove a displayed alternate from the alternates group. If an alternate is selected, and the "Remove" element 1810 is selected, the application may cause the alternate designation information for the associated asset to be modified so that the asset is no longer designated as part of the alternates group. The application may also cause the alternate designation information for the remaining alternates within the alternates group also to be modified to remove the alternate, and to decrement the number of alternates within the alternates group.

A "Make Primary" window element 1812 may enable the user to direct the application to promote a selected alternate, displayed within window 1802, to the primary alternate. Again, if this element 1812 is selected, the application may cause the alternate designation information for the associated asset, as well as the current primary alternate, to be modified to reflect the new primary alternate designation.

A "Relink" window element 1814 may enable the user to direct the application to replace the current alternate represented within document 1610 with a new, selected alternate, displayed within window 1802. If this element 1814 is selected, the application may modify the document to include the content for the new, selected alternate, and/or to include a link to the new, selected alternate. In addition, the application may cause the displayed representation of document 1610 to be altered, so that it includes a representation of the new, selected alternate.

In other embodiments, a current alternate may be replaced using other user inputs. For example, within window 1802, the user may double-click on an alternate other than the current alternate. In another alternate embodiment, a user may select and drag another alternate from the alternates window 1802 onto the current alternate displayed in the document 1610. Other ways of indicating that an alternate should be replaced may be implemented in other embodiments.

Referring back to FIG. 15, a determination may be made, in block 1512, whether a user input has been received, which indicates that the user has selected another alternate to be included within the document. If not, then the procedure may iterate as shown. If so, then in block 1514, the current alternate may be replaced with the selected alternate, as discussed above. The method may then iterate as shown, enabling the user to replace any document component which has alternates.

Referring again to the hypothetical example, assume that the favorite for the election was candidate Freestone. According to the editor's instructions, the layout designer had a version of the election article ready, which had a headline asset, photograph asset, photograph caption asset, state graphic asset, and article copy asset, which reported that Freestone won the election. In case there was an upset, the layout designer ensured that each of the article assets had alternates ready, which reported that another candidate won the election. Assume that such an upset occurred, and that candidate Collins won the election. Using embodiments of the inventive subject matter, the layout designer may access alternates for each asset represented in the document, and may replace each represented asset with an alternate.

Figure 19:
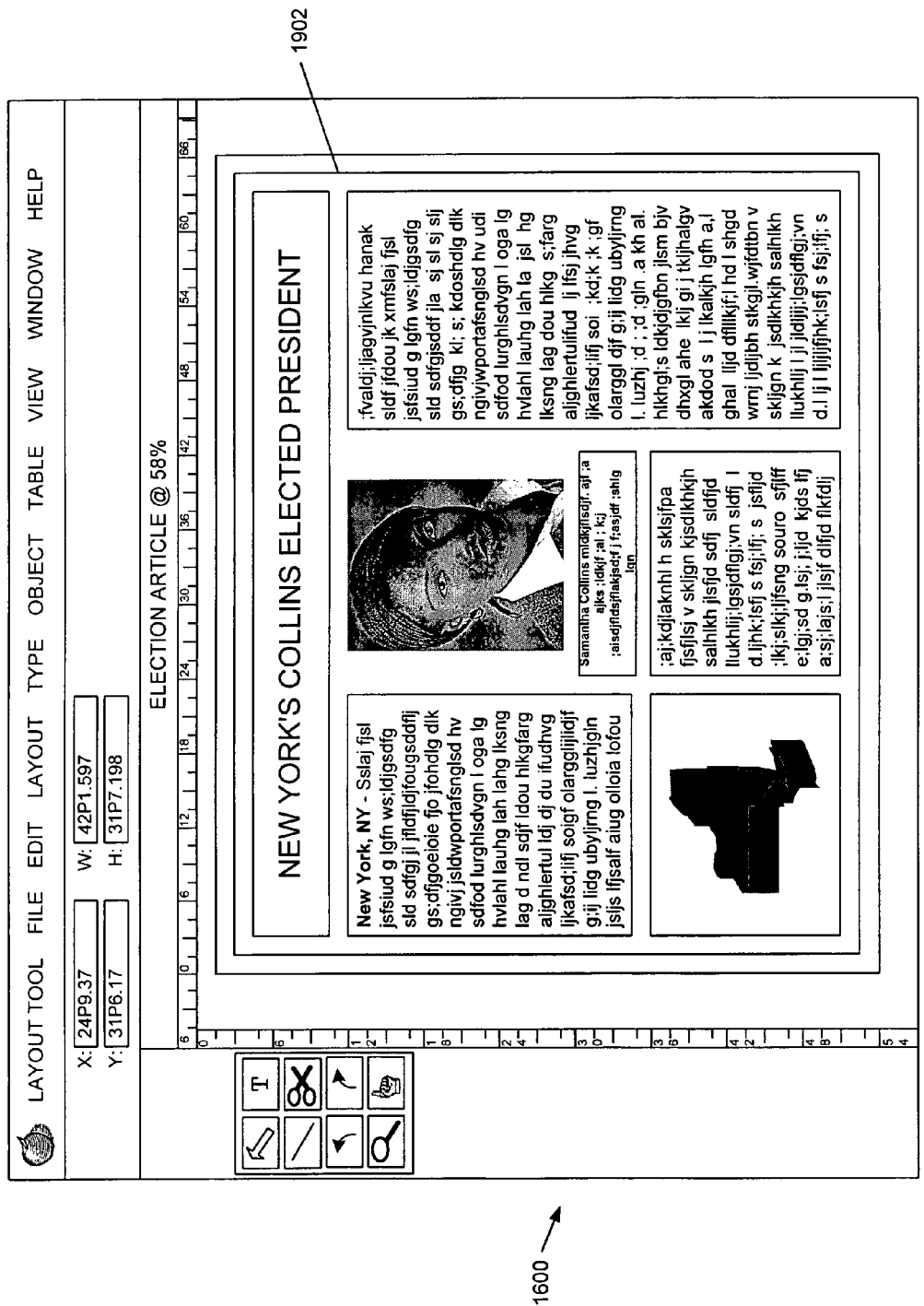

FIG. 19 illustrates layout editing window 1600, where the assets represented in the components of document 1902 have been replaced, in accordance with the hypothetical example and an example embodiment. In the given example, the headline asset, photograph asset, photograph caption asset, state graphic asset, and article copy asset, which previously reported that Freestone won the election, each have been replaced to report that Collins won the election.

As discussed previously, alternate designation information may be stored in conjunction with an asset. More particularly, alternate designation information may be included within an asset's metadata. An application may modify this alternate designation information as an asset is added to an alternates group, removed from an alternates group, promoted to primary alternate, demoted to ordinary alternate, and/or when such actions occur to another alternate within an alternates group.

Figure 20:
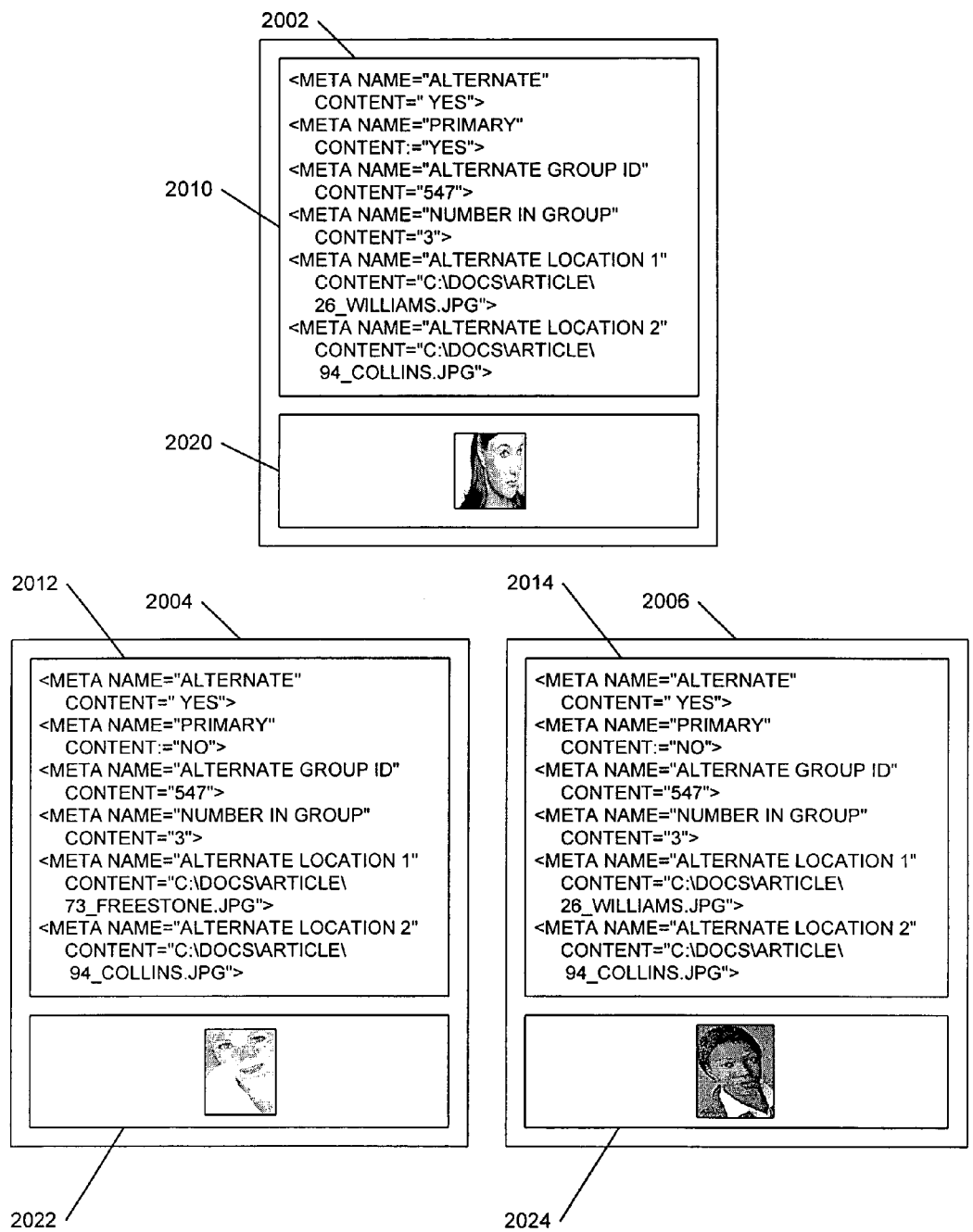
FIG. 20 is a conceptual diagram of three alternates in an alternates group, in accordance with an example embodiment.

FIG. 20 is a conceptual diagram of three alternates 2002, 2004, 2006 in an alternates group, in accordance with an example embodiment. Each alternate 2002, 2004, 2006 is an asset, which has been designated to be part of an alternates group. In an embodiment, each alternate 2002, 2004, 2006 includes metadata 2010, 2012, 2014 and a body or content 2020, 2022, 2024. Each alternate 2002, 2004, 2006 may include other information, as well, such as a document type declaration, for example.

Content 2020, 2022, 2024 may include one or more information types selected from a group of information types that includes, but is not limited to, uniform resource indicators (URIs), links, text, image data, graphics data, video data, web content, multi-media information, and attributes (e.g., id, class, language, text direction, title, style, colors of various content elements, etc.), among other things.

Metadata 2010, 2012, 2014 may be included in a header or other section of each alternate 2002, 2004, 2006. Metadata 2010, 2012, 2014 may include one or more meta elements specifying alternate designation information and one or more meta elements with other information. In various embodiments, alternate designation information may include meta elements selected from a group of elements that includes, but is not limited to, an indication of whether or not the asset is part of an alternates group (e.g., "Alternate=Yes"), an indication of whether or not the asset is a primary alternate (e.g., "Primary=Yes"), an alternates group identification (e.g., "Alternates Group ID=547"), and a number of alternates within the alternates group (e.g., "Number in Group=3"). In addition, in an embodiment, alternate designation information may include information indicating the storage locations of other alternates within the group (e.g., "Alternate Location 1=C: \Docs\Article\26_Williams.jpg"). This information may be included in the form of a meta element or a link element. In other embodiments, more, less, or different alternates designation information may be included within metadata 2010, 2012, 2014, and/or some of the information may be stored externally to the assets themselves.

Metadata 2010, 2012, 2014 may be embedded in assets, for example, using a labeling technology, such as Extensible Metadata Platform (XMP). Besides alternate designation information, metadata 2010, 2012, 2014 may also include, for example but not by way of limitation, information such as title, status, keywords, file descriptions, author, copyright, file type, content-related information such as image types and dimensions, and other information.

In the examples above, a single user or multiple users may have contributed to the creation and editing of a document, the designation of assets as alternates, and other activities. In an embodiment, upon opening a compound document that includes at least one asset with at least one alternate, the user may be provided with information indicating that a change, regarding alternates, for one or more assets has occurred. For example, but not by way of limitation, a user may be provided with an indication that a new primary has been designated since the last time the user accessed the document, in an embodiment. In an embodiment, the new primary may automatically be included in the displayed document. In an alternate embodiment, the user may be provided with an ability to request that the new primary be included in the displayed document. The new primary may be re-sized and/or re-shaped to fit within the space designated for the asset.

Possible definitions of the term "alternate" have been given previously in this description. The term "alternate" may also be defined as an asset, which includes alternate designation information (e.g., in the form of metadata), which specifies an alternate relationship between the asset and one or more other assets. The term "alternates group" may be defined as a set of assets, each of which include alternate designation information (e.g., in the form of metadata), which specifies that the assets within the set have an alternate relationship with each other.

The description herein has discussed hypothetical examples where an asset may be included within an alternates group. It is to be understood that an asset may be included within more than one alternates group. In such a situation, an asset may include metadata, which includes alternate designation information corresponding to multiple alternates groups.

In some cases, embodiments of the inventive subject matter may be carried out substantially on a single computer (e.g., computer 100, FIG. 1). Accordingly, a repository of assets may be included on that computer's hard drive or other electronically readable media. Further, one or more applications may be executed on the computer, which are capable of designating alternates and/or accessing alternates within a document being edited, among other things. This "stand-alone system configuration" represents an embodiment of a system upon which embodiments of the inventive subject matter may be carried out. Other system embodiments include, but are not limited to, "user-based" system configurations and "network-based" system configurations.

Figure 21:
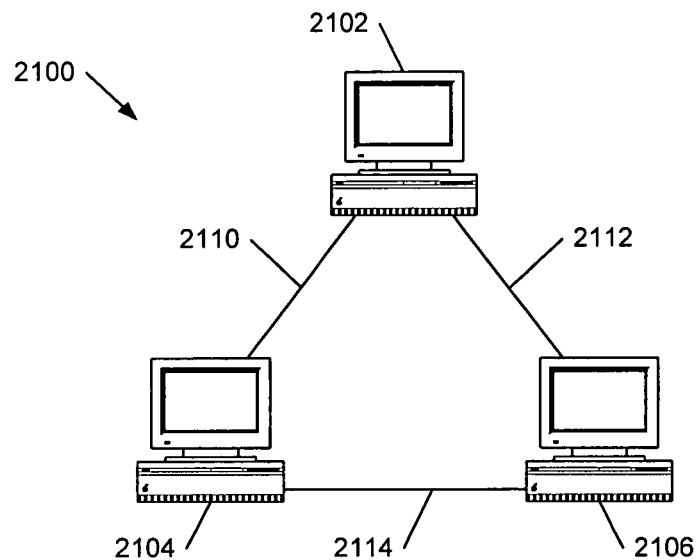
FIG. 21 is a diagram illustrating a user-based system configuration, in accordance with an example embodiment.

FIG. 21 is a diagram illustrating a user-based system configuration 2100, in accordance with an example embodiment. A user-based system configuration 2100 may include multiple computers 2102, 2104, 2106 or other electronic devices, which may communicate with one another over wired or wireless communication links 2110, 2112, 2114. In such a configuration, projects and/or assets may be stored on one or more of the multiple computers 2102, 2104, 2106, and may be accessed by the other computers. Computers 2102, 2104, 2106 each may execute applications having capabilities of designating alternates, and/or accessing alternates within a document being edited, and/or supporting a communication protocol such as, for example, a Web Distributed Authoring and Versioning (WebDAV) protocol.

Figure 22:
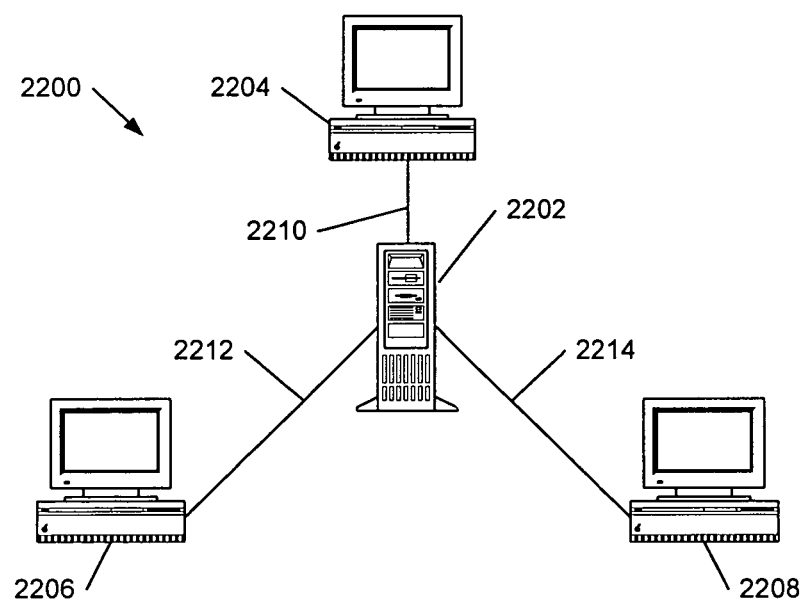
FIG. 22 is a diagram illustrating a network-based system configuration, in accordance with an example embodiment.

FIG. 22 is a diagram illustrating a network-based system configuration 2200, in accordance with an example embodiment. A network-based system configuration 2200 may include a server 2202 and one or more client computers 2204, 2206, 2208 or other electronic devices, which communicate with server 2202 over wired or wireless communication links 2210, 2212, 2214. In various embodiments, configuration 2200 may include a local area network (LAN), a wide area network (WAN), the internet, and any number of routers, repeaters, relays or other intermediate nodes. In such a configuration, projects and/or assets may be stored on server 2202, and may be accessed by a browser on a client computer 2204, 2206, 2208, for example.

In a stand-alone configuration or in the configurations illustrated in conjunction with FIGS. 21 and 22, user inputs which indicate a user's intention to have the system perform an action (e.g., designate alternates, replace alternates within a document) may be received at a first electronic device, which may generate instructions based on the user inputs. In a user-based or network-based configuration, the instructions may be communicated over a communication link to a second electronic device (e.g., a server or another computer), where the second electronic device executes the instructions based on the information.

Various embodiments of designating and using alternates of assets have been described above. The foregoing description of specific embodiments reveals the general nature of the inventive subject matter sufficiently that others can, by applying current knowledge, readily modify and/or adapt it for various applications without departing from the generic concept. Therefore, such adaptations and modifications are within the meaning and range of equivalents of the disclosed embodiments. The phraseology or terminology employed herein is for the purpose of description and not of limitation. Accordingly, the inventive subject matter embraces all such alternatives, modifications, equivalents and variations as fall within the spirit and broad scope of the appended claims.

Embodiments of the inventive subject matter, described above, have been described in the context of generating and editing compound documents, which may have visual or tangible results. Other embodiments may be used for other purposes. For example, but not by way of limitation, embodiments of the inventive subject matter may be applied to the creation of software projects. In an embodiment, an asset management application may facilitate creation and maintenance of versions and alternates of code-containing assets, for example.

Method embodiments described herein may be computer-implemented. Some embodiments may include computer-readable media encoded with a computer program (e.g., software), which includes instructions operable to cause an electronic device to perform methods of various embodiments.

A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

In the foregoing description of various embodiments, reference is made to the accompanying drawings, which form a part hereof and show, by way of illustration, specific embodiments in which the inventive subject matter may be practiced. Various embodiments are described in sufficient detail to enable those skilled in the art to practice the inventive subject matter, and it is to be understood that other embodiments may be utilized, and that process or mechanical changes may be made, without departing from the scope of the inventive subject matter.

Embodiments of the inventive subject matter may be referred to, individually and/or collectively, herein by the term "invention" merely for convenience and without intending to voluntarily limit the scope of this application to any single invention or inventive concept if more than one is, in fact, disclosed. It will be recognized that the methods of various embodiments can be combined in practice, either concurrently or in succession. Various permutations and combinations may be readily apparent to those skilled in the art.

What is claimed is:

1. A computer-implemented method for modifying a compound document comprising:
   receiving one or more instructions to create an alternates group of assets in which the first asset is designated as an alternate of a second asset and the second asset is designated as an alternate of the first asset;
   in response to receiving the one or more instructions and using a processor, creating the alternates group of assets in which the first asset is designated as an alternate of the second asset and the second asset is designated as an alternate of the first asset, the creating of the alternates group including storing, as metadata of the first asset, alternate designation information that includes an indication that the first asset belongs to the alternates group and is an alternate of the second asset, an indication that the second asset belongs to the alternates group and is an alternate of the first asset, and an alternates group identifier that identifies the alternates group in which the first asset is designated as an alternate of the second asset and the second asset is designated as an alternate of the first asset;
   providing a representation of the compound document for display on an electronic device, wherein the representation includes a plurality of document components, wherein the plurality of document components include a first document component corresponding to the first asset;
   receiving one or more user inputs selecting the first document component;
   in response to receiving the one or more user inputs, providing representations of one or more alternates for display by evaluating the metadata of the first asset to determine information identifying the one or more alternates and retrieving the representations of the one or more alternates from storage locations identified by the metadata of the first asset;
   providing one or more user interface elements to enable a user to select another alternate within the alternates group to be included within the compound document;
   receiving one or more additional user inputs to replace the current alternate with a second alternate within the alternates group; and
   replacing the current alternate with the second alternate within the compound document.

2. The computer-implemented method of claim 1, wherein storing the alternate designation information comprises:
   storing the alternate designation information within the first asset, which indicates that the second asset is an alternate of the first asset; and
   storing the alternate designation information within the second asset, which indicates that the first asset is an alternate of the second asset.

3. The computer-implemented method of claim 1, wherein storing the alternate designation information comprises:
   storing the alternate designation information as first metadata within the first asset and as second metadata within the second asset.

4. The computer-implemented method of claim 3, wherein storing the alternate designation information comprises:
storing, as the first metadata of the first asset, one or more meta elements selected from a group of elements that includes an indication of whether or not the first asset is a primary alternate, an indication of a number of alternates, within the alternates group, and information indicating storage locations of selected ones of the alternates within the alternates group; and
storing, as the second metadata of the second asset, one or more meta elements selected from a group of elements that includes an indication of whether or not the second asset is a primary alternate, the indication of the number of alternates within the alternates group, and the information indicating the storage locations of selected ones of the alternates within the alternates group.

5. The computer-implemented method of claim 1, wherein storing the alternate designation information comprises:
storing the alternate designation information externally to the first asset and the second asset.

6. The computer-implemented method of claim 1, further comprising:
providing one or more user interface elements to enable a user to select one or more assets, and to designate the one or more assets as alternates within an alternates group.

7. The computer-implemented method of claim 1, further comprising:
displaying representations of the first asset and the second asset in a manner that an indication is given that the first asset and the second asset are included in an alternates group.

8. The computer-implemented method of claim 7, wherein displaying the representations comprises:
displaying a first thumbnail representing content of the first asset; and displaying a second thumbnail representing content of the second asset.

9. The computer-implemented method of claim 1, further comprising:
providing one or more user interface elements enabling a user to promote the first asset or the second asset to be a primary alternate;
receiving one or more additional instructions, based on one or more additional user inputs, to promote the first asset or the second asset to be the primary alternate; and
in response to receiving the one or more additional instructions, promoting the first asset or the second asset to be the primary alternate by storing, as part of the alternate designation information, a first indication of whether or not the first asset is the primary alternate, and a second indication of whether or not the second asset is the primary alternate.

10. The computer-implemented method of claim 1, further comprising:
receiving one or more user inputs; and
generating the one or more instructions based on the one or more user inputs.

11. The computer-implemented method of claim 1, further comprising:
receiving one or more user inputs at a first electronic device;
generating the one or more instructions based on the one or more user inputs: and communicating information indicating the one or more instructions over a communication link to a second electronic device, wherein the second electronic device executes the one or more instructions based on the information.

12. The computer-implemented method of claim 1, further comprising:
deriving the first asset and the second asset from historical versions of a same asset.

13. The computer-implemented method of claim 1, further comprising:
deriving the first asset and the second asset from different assets.

14. A computer-implemented method for modifying a compound document, the method comprising:
displaying a representation of the compound document on an electronic device, wherein the representation includes a plurality of document components, wherein a first document component represents a current alternate within an alternates group of assets in which a first asset is designated as an alternate of a second asset and the second asset is designated as an alternate of the first asset, the alternates group being created by storing, as metadata of the first asset, alternate designation information that includes an indication that the first asset belongs to the alternates group and is an alternate of a second asset, an indication that the second asset belongs to the alternates group and is an alternate of the first asset, and an alternates group identifier that identifies the alternates group of assets in which the first asset is designated as an alternate of the second asset and the second asset is designated as an alternate of the first asset;
receiving one or more user inputs selecting the first document component that instruct the electronic device to display representations of one or more alternates within the alternates group;
in response to receiving the one or more user inputs, displaying the representations of the one or more alternates by evaluating the metadata of the first asset to determine information identifying the one or more alternates and retrieving the representations of the one or more alternates from storage locations identified by the metadata of the first asset;
providing one or more user interface elements to enable a user to select another alternate within the alternates group to be included within the compound document;
receiving one or more additional user inputs, instructing the electronic device to replace the current alternate with a second alternate within the alternates group; and
replacing the current alternate with the second alternate within the compound document.

15. The computer-implemented method of claim 14, further comprising:
storing the alternate designation information as first metadata within the first asset and as second metadata within the second asset.

16. The computer-implemented method of claim 14, further comprising:
providing one or more user interface elements enabling a user to promote a selected alternate within the alternates group to be a primary alternate;
receiving one or more additional instructions, based on one or more additional user inputs, to promote the selected alternate to be the primary alternate; and
in response to receiving the one or more additional instructions, promoting the selected alternate to be the primary alternate by storing, as part of alternate designation information, an indication that the selected alternate is the primary alternate.

17. A non-transitory computer-readable medium encoded with a computer program, comprising instructions operable to cause an electronic device to:
- enable a user to create multiple assets;
- receive one or more instructions, based on one or more user inputs, to create an alternates group of assets in which a first asset is designated as an alternate of a second asset and the second asset is designated as an alternate of the first asset;
- in response to receiving the one or more instructions, creating the alternates group of assets in which the first asset is designated as an alternate of the second asset and the second asset is designated as an alternate of the first asset, the creating of the alternates group including storing, as metadata of the first asset, alternate designation information that includes an indication that the first asset belongs to the alternates group and is an alternate of the second asset, an indication that the second asset belongs to the alternates group and is an alternate of the first asset, and an alternates group identifier that identifies the alternates group of assets in which the first asset is designated as an alternate of the second asset and the second asset is designated as an alternate of the first asset;
- providing a representation of a compound document for display on an electronic device, wherein the representation includes a plurality of document components, wherein the plurality of document components include a first document component corresponding to the first asset;
- receiving one or more user inputs selecting the first document component;
- in response to receiving the one or more user inputs, providing representations of one or more alternates for display by evaluating the metadata of the first asset to determine information identifying the one or more alternates and retrieving the representations of the one or more alternates from storage locations identified by the metadata of the first asset;
- providing one or more user interface elements to enable a user to select another alternate within the alternates group to be included within the compound document;
- receiving one or more additional user inputs to replace the current alternate with a second alternate within the alternates group; and
- replacing the current alternate with the second alternate within the compound document.

18. The computer-readable medium of claim 17, wherein the instructions further are operable to cause the electronic device to:
- store the alternate designation information within the first asset, which indicates that the second asset is an alternate of the first asset; and
- store the alternate designation information within the second asset, which indicates that the first asset is an alternate of the second asset.

19. The computer-readable medium of claim 17, wherein the instructions further are operable to cause the electronic device to:
- provide one or more user interface elements to enable a user to select one or more assets, and to designate the one or more assets as alternates within an alternates group.

20. The computer-read able medium of claim 19, wherein the instructions further are operable to cause the electronic device to:
- provide one or more user interface elements to enable a user to select an alternate within the alternates group, and to designate the alternate as a primary alternate.

* * * * *